United States Patent
Kikuchi et al.

(10) Patent No.: US 11,403,741 B2
(45) Date of Patent: Aug. 2, 2022

(54) VIDEO SIGNAL PROCESSING APPARATUS, VIDEO SIGNAL PROCESSING METHOD, AND PROGRAM

(71) Applicant: SONY CORPORATION, Tokyo (JP)

(72) Inventors: Hiroaki Kikuchi, Kanagawa (JP); Jun Onuki, Kanagawa (JP); Masaki Hirose, Tokyo (JP)

(73) Assignee: SONY CORPORATION, Tokyo (JP)

( * ) Notice: Subject to any disclaimer, the term of this patent is extended or adjusted under 35 U.S.C. 154(b) by 243 days.

(21) Appl. No.: 16/477,647

(22) PCT Filed: Dec. 28, 2017

(86) PCT No.: PCT/JP2017/047179
§ 371 (c)(1),
(2) Date: Jul. 12, 2019

(87) PCT Pub. No.: WO2018/135291
PCT Pub. Date: Jul. 26, 2018

(65) Prior Publication Data
US 2020/0126197 A1    Apr. 23, 2020

(30) Foreign Application Priority Data

Jan. 19, 2017    (JP) .............................. JP2017-007470

(51) Int. Cl.
*G06T 5/40*    (2006.01)
*H04N 9/69*    (2006.01)
(Continued)

(52) U.S. Cl.
CPC ............. *G06T 5/40* (2013.01); *H04N 5/2355* (2013.01); *H04N 9/69* (2013.01); *H04N 9/77* (2013.01);
(Continued)

(58) Field of Classification Search
CPC . G06T 5/40; G06T 5/009; G06T 2207/20208; H04N 5/2355; H04N 9/69; H04N 9/77
See application file for complete search history.

(56) References Cited

U.S. PATENT DOCUMENTS

| | | | | |
|---|---|---|---|---|
| 4,899,216 A | * | 2/1990 | Tatsumi | ............... H04N 1/4074 358/521 |
| 7,142,704 B2 | * | 11/2006 | Hara | ...................... A61B 6/563 382/131 |

(Continued)

FOREIGN PATENT DOCUMENTS

| | | |
|---|---|---|
| JP | 2006-211650 A | 8/2006 |
| JP | 2008-305122 A | 12/2008 |

(Continued)

OTHER PUBLICATIONS

Sajeena et al., "An Improved HDR Image Processing Using Fast Global Tone Mapping" (Year: 2013).*

(Continued)

*Primary Examiner* — Manav Seth
(74) *Attorney, Agent, or Firm* — Oblon, McClelland, Maier & Neustadt, L.L.P.

(57) ABSTRACT

There is provided a video signal processing apparatus, including: a first interface configured to obtain a first video signal imaged within a first dynamic range; a second interface configured to obtain information for specifying a partial area of the obtained first video signal; and an arithmetic processing circuit configured to calculate a representative value of brightness of the first video signal of the partial area, to compress a dynamic range of the first video signal depending on the calculated representative value, and to generate a second video signal, a dynamic range of the second video signal being restricted to a second dynamic range narrower than the first dynamic range.

20 Claims, 14 Drawing Sheets

(51) Int. Cl.
*H04N 9/77* (2006.01)
*H04N 5/235* (2006.01)
*G06T 5/00* (2006.01)

(52) U.S. Cl.
CPC .... *G06T 5/009* (2013.01); *G06T 2207/20208* (2013.01)

(56) References Cited

U.S. PATENT DOCUMENTS

| | | | | |
|---|---|---|---|---|
| 8,248,486 | B1* | 8/2012 | Ward | H04N 1/60 348/223.1 |
| 8,270,759 | B2* | 9/2012 | El-Mahdy | G09G 5/02 382/276 |
| 8,391,598 | B2* | 3/2013 | Lin | G06T 5/008 382/167 |
| 8,487,950 | B2* | 7/2013 | Tanaka | H04N 9/646 345/589 |
| 8,537,893 | B2* | 9/2013 | Efremov | H04N 19/59 375/240.12 |
| 8,687,087 | B2* | 4/2014 | Pertsel | H04N 5/2355 348/229.1 |
| 8,873,877 | B2* | 10/2014 | Su | H04N 19/86 382/239 |
| 8,908,055 | B2* | 12/2014 | Furumura | H04N 5/23238 348/218.1 |
| 8,982,963 | B2* | 3/2015 | Gish | H04N 19/36 375/240.25 |
| 9,300,938 | B2* | 3/2016 | Atkins | G09G 5/005 |
| 9,445,111 | B2* | 9/2016 | Sato | H04N 19/30 |
| 9,489,726 | B2* | 11/2016 | Boitard | G06T 5/009 |
| 9,516,283 | B2* | 12/2016 | Hilkes | G02B 27/017 |
| 9,571,838 | B2* | 2/2017 | Sato | H04N 19/105 |
| 9,583,133 | B2* | 2/2017 | Hirata | H04N 5/232933 |
| 9,594,488 | B2* | 3/2017 | Deselaers | G06F 3/013 |
| 9,621,767 | B1* | 4/2017 | El Mezeni | H04N 19/186 |
| 9,741,305 | B2* | 8/2017 | Jung | G09G 3/3406 |
| 10,007,412 | B2* | 6/2018 | Tao | H04N 19/85 |
| 10,043,251 | B2* | 8/2018 | Huang | H04N 9/68 |
| 10,075,655 | B2* | 9/2018 | Tao | G06T 5/008 |
| 10,136,074 | B2* | 11/2018 | Tao | H04N 9/68 |
| 10,148,906 | B2* | 12/2018 | Seifi | G06T 5/009 |
| 10,200,701 | B2* | 2/2019 | Bugdayci Sansli | H04N 19/184 |
| 10,298,857 | B2* | 5/2019 | Porter | H04N 5/23293 |
| 10,313,687 | B2* | 6/2019 | Stessen | H04N 19/98 |
| 10,593,028 | B2* | 3/2020 | Najaf-Zadeh | G06T 15/205 |
| 10,965,879 | B2* | 3/2021 | Kamiya | H04N 5/20 |
| 2008/0107360 | A1* | 5/2008 | Yamashita | G06T 5/004 382/313 |
| 2012/0147953 | A1* | 6/2012 | El-Mahdy | H04N 19/44 375/240.03 |
| 2014/0267822 | A1* | 9/2014 | Roffet | G06T 5/40 348/222.1 |
| 2014/0320694 | A1* | 10/2014 | Okuno | H04N 5/2351 348/229.1 |
| 2017/0078706 | A1* | 3/2017 | Van Der Vleuten | H04N 19/46 |
| 2017/0180759 | A1* | 6/2017 | Mertens | H04N 19/70 |
| 2019/0073756 | A1* | 3/2019 | Stessen | H04N 19/186 |
| 2019/0082186 | A1* | 3/2019 | Van Der Vleuten | H04N 5/20 |
| 2019/0349581 | A1* | 11/2019 | Fuchie | H04N 19/136 |
| 2020/0007735 | A1* | 1/2020 | Kamiya | H04N 5/235 |

FOREIGN PATENT DOCUMENTS

| | | |
|---|---|---|
| JP | 2013-118468 A | 6/2013 |
| JP | 2014-16670 A | 1/2014 |
| JP | 2015-103214 A | 6/2015 |
| WO | WO 2007/043460 A1 | 4/2007 |

OTHER PUBLICATIONS

Lakshmi et al., "Analysis of Tone mapping Operators on High Dynamic Range Images" (Year: 2012).*

Goris et al., "Philips response to CfE on HDR and WCG" (Year: 2015).*

International Search Report dated Mar. 28, 2018 in PCT/JP2017/047179, 5 pages.

Erik Reinhard et al: "Chapter 7 Perception-Based Tone Reproduction" In: "High Dynamic Range Imaging", May 25, 2010, Elsevier Science & Technology, XP055460369, pp. 233-276.

Dongni Zhang et al: "Histogram Partition Based Gamma Correction For Image Contrast Enhancement", Consumer Electronics (ISCE), 2012 IEEE 16th International Symposium on, IEEE, XP032203081, Jun. 4, 2012, pp. 1-4.

* cited by examiner

VIDEO SIGNAL PROCESSING APPARATUS, VIDEO SIGNAL PROCESSING METHOD, AND PROGRAM

CROSS REFERENCE TO RELATED APPLICATIONS

This application claims the benefit of Japanese Priority Patent Application JP 2017-007470 filed Jan. 19, 2017, the entire contents of which are incorporated herein by reference.

TECHNICAL FIELD

The present technology relates to a video signal processing apparatus, a video signal processing method, and a program that generate, from a video signal imaged within a first dynamic range, a video signal of a second dynamic range narrower than the first dynamic range.

BACKGROUND ART

In HDR (High Dynamic Range) imaging, it is possible to express an image with a wide dynamic range, and express dark areas and high brightness colors, which are hard to express with a video signal of SDR (Standard Dynamic Range). The video signal of SDR has a standard dynamic range and can be displayed on a normal monitor.

Examples of well-known technologies relating to video signal processing of HDR and LDR include a technology for simultaneously generating HDR video and LDR video (see Patent Literature 1), and a technology for converting LDR video into HDR video (see Patent Literature 2). Note that LDR is synonymous with SDR.

CITATION LIST

Patent Literature

PTL 1: Japanese Patent Application Laid-open No. 2016-195379
PTL 2: WO 2011/04222

SUMMARY

Technical Problem

However, in the case of generating, from a video signal imaged by a camera having the wide first dynamic range such as HDR, a video signal of the second dynamic range such as SDR narrower than the first dynamic range, there are various problems such as occurrence of blown out highlights in a high brightness portion and blocked up shadows in a low brightness portion, and a sufficient solution method has not yet been established.

It is desirable to provide a video signal processing apparatus, a video signal processing method, and a program that are capable of obtaining a video signal with high quality.

Solution to Problem

According to a first embodiment of the present technology, there is provided an electronic device including circuitry configured to obtain a first video signal having a first dynamic range; calculate a representative value of brightness of a partial area of the first video signal; modify the first dynamic range of the first video signal based on the calculated representative value; and generate a second video signal based on the modifying, the second video signal having a second dynamic range that is different than the first dynamic range.

The circuitry may be configured to modify the dynamic range of the first video signal by compressing the dynamic range of the first video signal based on the calculated representative value.

The second dynamic range of the second video signal may be narrower than the first dynamic range of the first video signal According to another embodiment of the present technology, there is provided a video signal processing method performed by an electronic device, the method including: obtaining a first video signal having a first dynamic range; calculating a representative value of brightness of a partial area of the first video signal; modifying the first dynamic range of the first video signal based on the calculated representative value; and generating a second video signal based on the modifying, the second video signal having a second dynamic range that is different than the first dynamic range According to another embodiment of the present technology, there is provided a non-transitory computer-readable medium including computer program instructions, which when executed by an electronic device, cause the electronic device to: obtain a first video signal having a first dynamic range; calculate a representative value of brightness of a partial area of the first video signal; modify the first dynamic range of the first video signal based on the calculated representative value; and generate a second video signal based on the modifying, the second video signal having a second dynamic range that is different than the first dynamic range.

According to another embodiment of the present technology, there is provided an electronic device including circuitry configured to obtain a video signal having a first dynamic range; calculate a first value indicating a brightness of a first portion of the video signal, wherein the first portion of the video signal is less than the entirety of the video signal; and modify the first dynamic range of the first portion of the video signal based on the calculated value.

According to another embodiment of the present technology, there is provided a video processing method performed by an electronic device, the video processing method including: obtaining a video signal having a first dynamic range; calculating, by circuitry of the electronic device, a first value indicating a brightness of a first portion of the video signal that is less than an entirety of the video signal; and modifying, by the circuitry, the first dynamic range of the first portion of the video signal based on the calculated value.

According to another embodiment of the present technology, there is provided a non-transitory computer-readable medium including computer program instructions, which when executed by an electronic device, cause the electronic device to: obtain a video signal having a first dynamic range; calculate a first value indicating a brightness of a first portion of the video signal that is less than an entirety of the video signal; and modify the first dynamic range of the first portion of the video signal based on the calculated value.

The electronic device according to the present technology can also be configured as an information processing apparatus, a server, and the like. The arithmetic processing circuit can be configured by a CPU or the like.

Advantageous Effects

As described above, according to the present technology, it is possible to obtain a video signal with high quality.

DESCRIPTION OF EMBODIMENTS

Hereinafter, embodiments of the present technology will be described with reference to the drawings.

(Video Signal Processing System)

Figure 1:
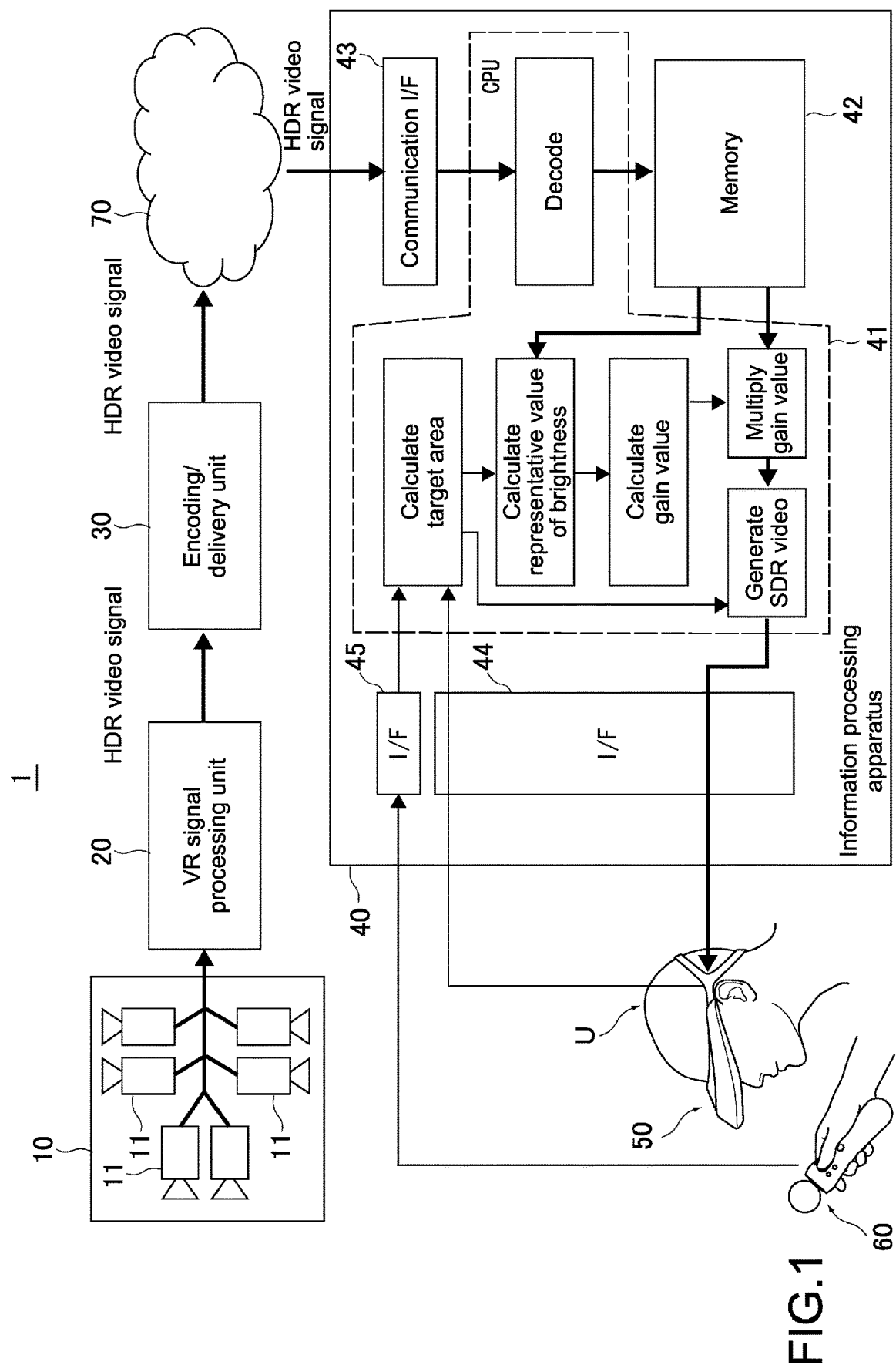
FIG. 1 is a block diagram showing a configuration of a video signal processing system 1 according to a first embodiment of the present technology.

FIG. 1 is a block diagram showing a configuration of a video signal processing system 1 according to a first embodiment of the present technology.

The video signal processing system 1 according to this embodiment includes an imaging unit 10, a VR signal processing unit 20, an encoding/delivery unit 30, an information processing apparatus 40, a head mounted display (hereinafter, referred to as "HMD") 50, and an HMD controller 60. VR is an abbreviation of Virtual Reality.

(Imaging Unit 10)

The imaging unit 10 includes one or more cameras 11 that are capable of capturing images in a relatively wide first dynamic range such as HDR. In this embodiment, for example, the imaging unit 10 including a plurality of cameras 11 is used for causing the HMD 50 to display 360-degree panoramic video as VR video. A plurality of HDR video signals by imaged the plurality of cameras 11 of the imaging unit 10 are transmitted to the VR signal processing unit 20 by a transmission interface (not shown).

(VR Signal Processing Unit 20)

The VR signal processing unit 20 includes, for example, a CPU (Central Processing Unit), a memory, a transmission interface, and the like. The CPU of the VR signal processing unit 20 receives a plurality of HDR video signals transmitted from the imaging unit 10, performs stitching in which the plurality of HDR video signals are spatially combined by using the memory, lens distortion correction, and the like to generate VR video such as 360-degree panoramic video, and supplies the VR video to the encoding/delivery unit 30 by using the transmission interface.

(Encoding/delivery Unit 30)

The encoding/delivery unit 30 includes, for example, a CPU, a memory, a transmission interface, a communication interface, and the like. In response to a delivery request of VR video from the information processing apparatus 40, the encoding/delivery unit 30 encodes a HDR video signal of the VR video obtained from the VR signal processing unit 20 by using the transmission interface into data in a format suitable for network transmission, and delivers the HDR video signal to the information processing apparatus 40 of the delivery request source via a network 70 such as the Internet by using the communication interface.

(Information Processing Apparatus 40)

The information processing apparatus 40 transmits a delivery request of VR video to the encoding/delivery unit 30, receives an HDR video signal of VR video delivered from the encoding/delivery unit 30 in response to this request, and generates, from the received HDR video signal, an SDR video signal to be supplied to the HMD 50 for display.

The information processing apparatus 40 includes a CPU 41, a memory 42, a communication interface 43 with the network 70, a communication interface 44 with the HMD 50, and a communication interface 45 with the HMD controller 60.

The memory 42 stores an operating system and an application program to be executed by the CPU 41. Further, the memory 42 provides a working area for calculation processing of the CPU 41, a temporary storage area of the HDR video signal delivered from the encoding/delivery unit 30, and the like.

The communication interface 43 with the network 70 is used for transmitting a delivery request of VR video to the encoding/delivery unit 30 via the network 70 and receiving an HDR video signal of VR video delivered from the encoding/delivery unit 30 in response to this delivery request. The communication interface 43 with the network 70 may be an apparatus compatible with wireless LAN (Local Area Network) or a wire communication apparatus that performs wired communication. Further, the information processing apparatus 40 may obtain VR video via a physical medium such as an optical disc instead of receiving delivery of VR video from the encoding/delivery unit 30 via the network 70. In this case, the information processing apparatus 40 only needs to be configured to read VR video from the physical medium by using a medium interface such as a drive apparatus to which the physical medium is detachably attached.

The communication interface 44 with the HMD 50 is used for transmitting an SDR video signal from the information processing apparatus 40 to the HMD 50, and obtaining a detection signal of a sensor such as a gyro sensor, an acceleration sensor, and a camera in the HMD 50. As the communication interface 44 with the HMD 50, for example, an HDMI (High-Definition Multimedia Interface) (registered trademark), a USB (Universal Serial Bus), a combination thereof, and the like are used. Alternatively, short-distance wireless communication such as Bluetooth (registered trademark), a wireless LAN such as Wi-Fi (registered trademark), and the like may be used.

The communication interface 45 with the HMD controller 60 is an interface used for obtaining, from the HMD controller 60, an operation signal of zoom-in/zoom-out or an operation signal corresponding to an operation of a selection/determination button. The communication interface 45 with the HMD controller 60 may be, for example, short-distance wireless communication such as Bluetooth (registered trademark), a wireless LAN such as Wi-Fi (registered trademark), a wireless USB (Universal Serial Bus), or the like The CPU 41 of the information processing apparatus 40 receives an HDR video signal of VR video delivered from the encoding/delivery unit 30 by using the communication interface 43 with the network 70, and decodes the received HRD video signal. Further, the CPU 41 obtains a detection signal of a sensor such as a gyro sensor and an acceleration sensor in the HMD 50 by using the communication interface 44 with the HMD 50, detects, from the obtained detection signal, a line-of-sight direction (azimuth angle, attitude angle) in VR space of a user U wearing the HMD 50, and calculates, as a target area, an area of an arbitrary size in a central portion of an area (display area) corresponding to the display resolution of the HMD 50 in this line-of-sight direction.

When calculating the target area, the CPU 41 of the information processing apparatus 40 calculates a representative value of brightness of the HDR video signal of the target area on the basis of the HDR video signal stored in the memory 42. The CPU 41 of the information processing apparatus 40 determines a negative gain value on the basis of the representative value of brightness, compresses the dynamic range of the HDR video signal by multiplying the HDR video signal by the negative gain value, and restricts the dynamic range further to the second dynamic range such as SDR, thereby generating an SDR video signal. The CPU 41 of the information processing apparatus 40 performs control to supply, to the HMD 50, the generated SDR video signal by using the communication interface 44 with the HMD 50.

(HMD 50)

The HMD 50 includes a display, a gyro sensor, an acceleration sensor, a communication interface with the information processing apparatus 40, and a communication interface with the HMD controller 60.

The display is a display capable of displaying VR panoramic video generated by the VR signal processing unit 20.

The respective detections signals of the gyro sensor and the acceleration sensor provided to the HMD 50 are transmitted to the information processing apparatus 40 by using the communication interface with the information processing apparatus 40.

The HMD controller 60 includes, for example, a CPU, a memory, a gyro sensor, an acceleration sensor, a communication interface with the information processing apparatus 40, a selection/determination button, and the like.

The CPU of the HMD controller 60 transmits a detection signal or an operation signal of a selection/determination button generated by the gyro sensor, the acceleration sensor, or the like when the user U spatially moves the HMD controller 60, to the information processing apparatus 40 by using the communication interface.

The CPU 41 of the information processing apparatus 40 combines VR video to be displayed in the HMD 50 and a plurality of objects such as a plurality of buttons to be operated by the user U, a cursor pointer linked with an operation of the HMD controller 60, and the like, for display. Examples of functions assigned to the plurality of objects include zoom-in and zoom-out of VR video to be displayed by the HMD 50. The user U operates the HMD controller 60 to cause the cursor pointer to move to the position of the object to which a target function is assigned, and presses the selection/determination button provided to the HMD controller 60, and thus, the CPU of the information processing apparatus 40 performs processing for performing the function.

Note that in calculation of the target area by the CPU 41 of the information processing apparatus 40, for example, also operations signals of zoom-in and zoom-out supplied from the HMD controller 60 are used in addition to the respective detection signals of the gyro sensor and the acceleration sensor supplied from the HMD 50. That is, the CPU 41 of the information processing apparatus 40 recalculates the target area on the basis of the operations signals of zoom-in and zoom-out supplied from the HMD controller 60.

Note that examples of another method of calculating the target area include a method of receiving infrared rays emitted from an external laser emitter by a plurality of infrared sensors attached to the HMD 50, and calculating the position and direction of the HMD 50 by analyzing the output signal to calculate the target area on the basis of the calculation result. Alternatively, the target area may be calculated from the calculation result obtained by imaging light from a light source such as an LED attached to the HMD 50 by an external infrared camera or the like and analyzing the captured image to calculate the position and direction of the HMD 50.

(Regarding Brightness of Video of Target Area)

Figure 2:
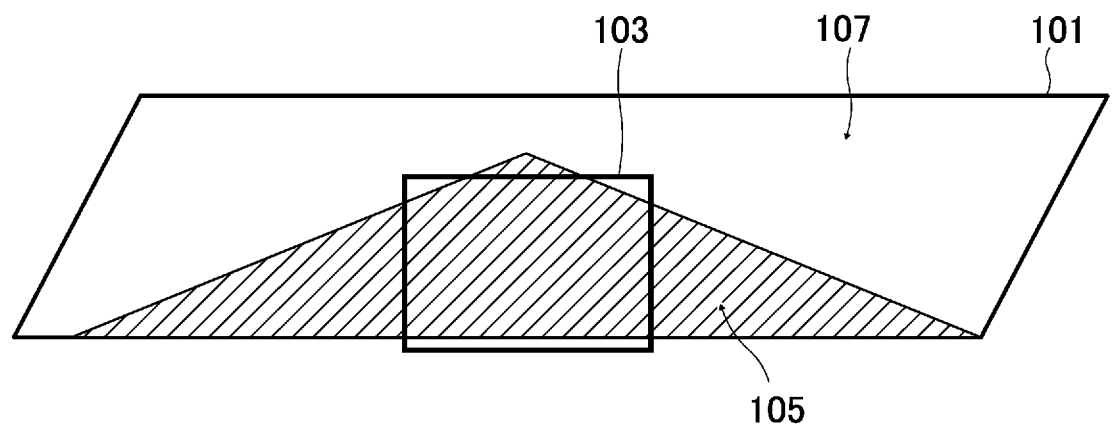
FIG. 2 is a diagram describing a target area 103 in a VR panoramic video 101.

FIG. 2 is a diagram describing a target area 103 in a VR panoramic video 101.

In FIG. 2, the portion filled with diagonal lines in the VR panoramic video 101 is a shaded portion video 105, and the other part is a sunny portion video 107. The sunny portion video 107 is generally brighter than the shaded portion video 105. Note that the area surrounded by a square is the target area 103. In the example of FIG. 2, most of the video of the target area 103 is the shaded portion video 105.

Figure 3:
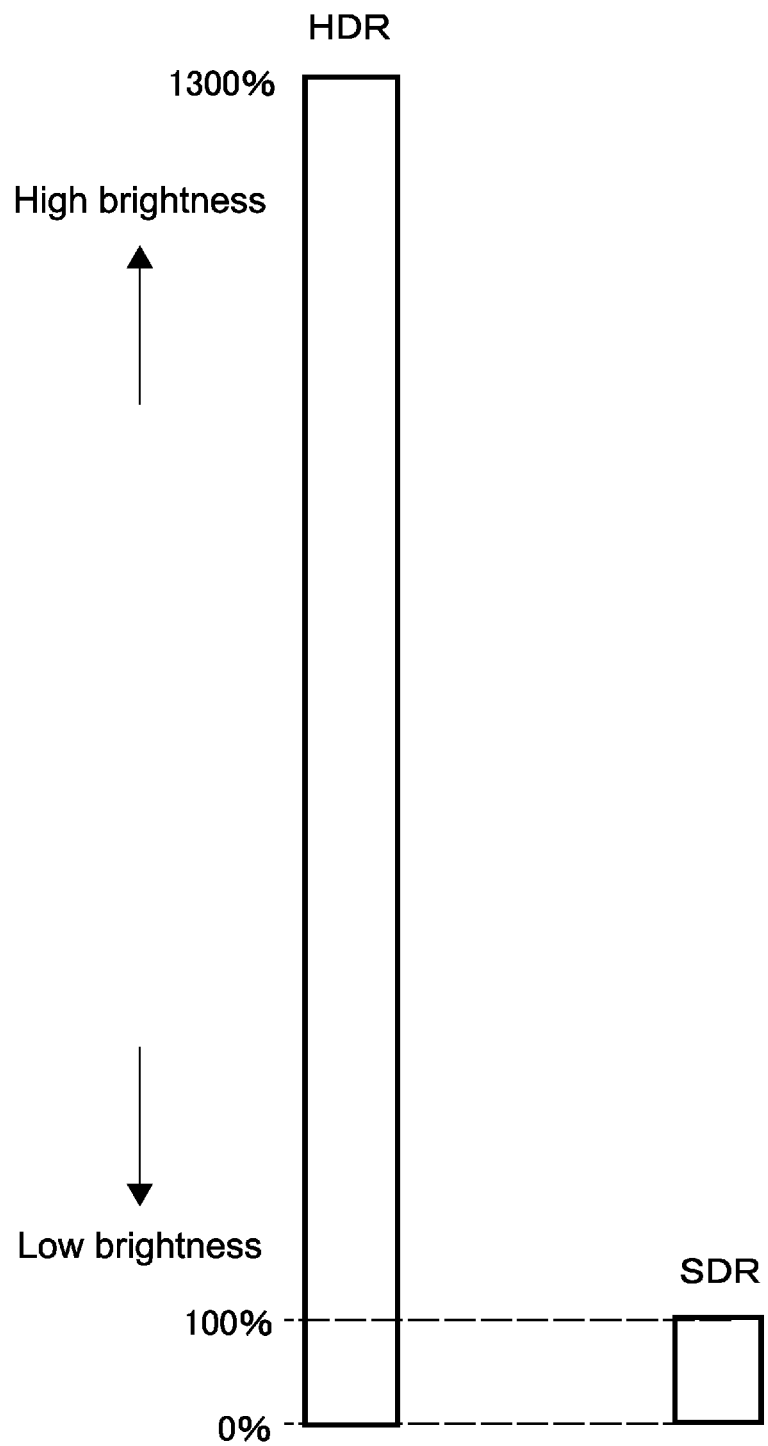
FIG. 3 is a diagram showing a comparison between a first dynamic range (HDR) and a second dynamic range (SDR).

FIG. 3 is a diagram showing a comparison between the first dynamic range (HDR) and the second dynamic range (SDR).

Figure 4:
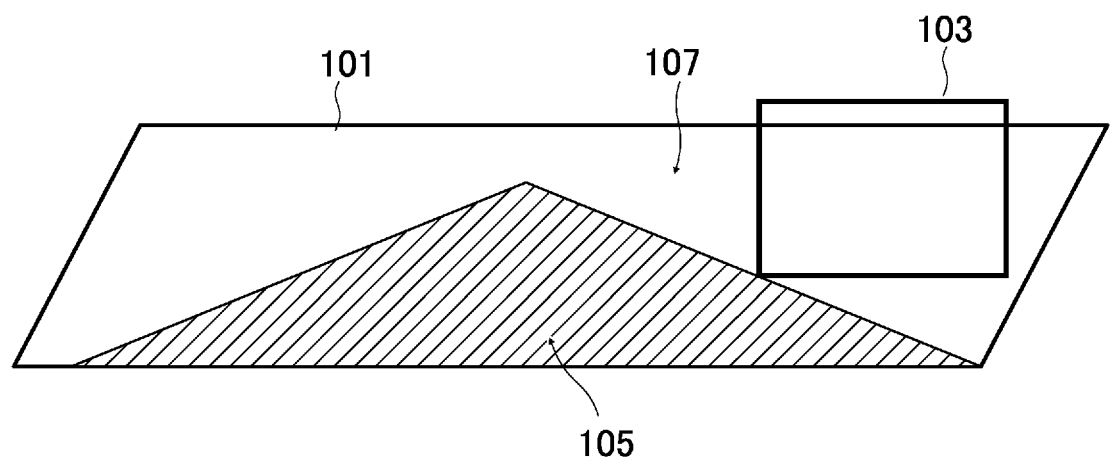
FIG. 4 is a diagram showing a case where the target area 103 in the VR panoramic video 101 is in a sunny portion.

In the case where the second dynamic range (SDR) is 100%, the first dynamic range (HDR) is wider than the second dynamic range (SDR), e.g., 1300%. Note that in the case where the second dynamic range (SDR) corresponds to the range portion of 0 to 100% of the first dynamic range (HDR), even when displaying video of generally dark portion such as the shaded portion video 105 shown in FIG. 2 within the second dynamic range (SDR), no significant change appears between the contrast of the HDR video signal and the contrast of the SDR video signal. However, for example, in the case where most of the video of the target area 103 is bright video such as the sunny portion video 107 as shown in FIG. 4, a significant decrease in the contrast or blown out highlights may occur in the video displayed within the second dynamic range (SDR).

In this embodiment, in order to solve such a problem, the CPU 41 of the information processing apparatus 40 is configured to calculate a representative value of brightness of the HDR video signal of the target area, compress the dynamic range of the HDR video signal by multiplying the HDR video signal by a negative gain value determined on the basis of the representative value of brightness, and restrict the dynamic range further to the second dynamic range (SDR), thereby to generating an SDR video signal.

(Operation of Video Signal Processing System 1)

Next, an operation of the video signal processing system 1 according to this embodiment will be described.

The CPU 41 of the information processing apparatus 40 transmits a delivery request of VR video to the encoding/delivery unit 30 by using the communication interface 43 with the network 70.

When receiving the delivery request of VR video from the information processing apparatus 40, the CPU of the encoding/delivery unit 30 encodes the HDR video signal of VR video transmitted from the VR signal processing unit 20 into data in a format suitable for network transmission, packetizes the data, and delivers the data to the information processing apparatus 40 via the network 70.

The CPU 41 of the information processing apparatus 40 receives the HDR video signal of VR video delivered from the encoding/delivery unit 30 via the network 70 by using the communication interface 43, decodes the received HDR video signal, and stores the decoded signal in the memory 42.

The CPU 41 of the information processing apparatus 40 obtains the respective detection signals of the gyro sensor and the acceleration sensor from the HMD 50, detects the line-of-sight direction (azimuth angle, attitude angle) in VR space of the user U wearing the HMD 50 by using the respective detection signals, and calculates, as the above-mentioned target area, an area of an arbitrary size in a central portion of an area corresponding to the display resolution of the HMD 50 in this line-of-sight direction.

Next, the CPU 41 of the information processing apparatus 40 calculates a representative value of brightness of the HDR video signal of the calculated target area, and calculates a negative gain value to be multiplied by the HDR video signal on the basis of the representative value of brightness. Next, the CPU 41 of the information processing apparatus 40 compress the dynamic range of the HDR video signal by multiplying the HDR video signal by the calculated negative gain value, and restricts the dynamic range further to the second dynamic range (SDR), thereby generating the SDR video signal. The generation of the SDR video signal will be described later in detail.

Next, the CPU 41 of the information processing apparatus 40 cuts out an SDR video signal of an area including the above-mentioned target area from the generated SDR video signal, and supplies the SDR video signal of the area including the target area to the HMD 50 by using the communication interface 44 with the HMD 50.

The HMD 50 receives the SDR video signal supplied from the information processing apparatus 40, and displays the received SDR video signal on a display.

(Conversion of Dynamic Range from HDR to SDR)

Now, conversion of the dynamic range from HDR to SDR will be described in detail.

The CPU 41 of the information processing apparatus 40 calculates, for example, an average brightness value or the like as a representative value of brightness of an HDR video signal of the target area. Note that the representative value of brightness of the HDR video signal of the target area is not limited to an average brightness value. Other representative values of brightness will described later.

Figure 5:
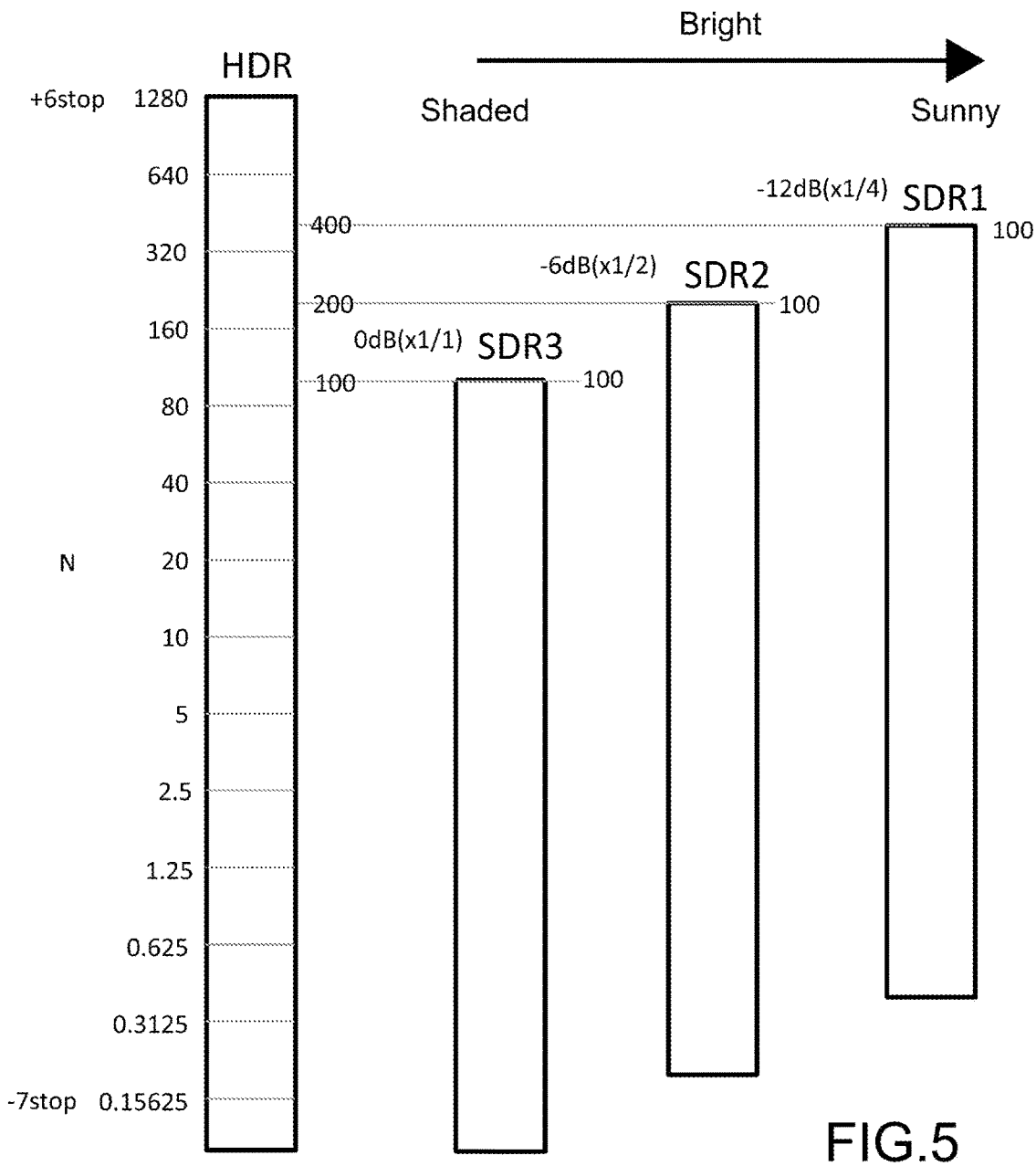
FIG. 5 is a diagram showing an example of conversion of a dynamic range from HDR into SDR.

FIG. 5 is a diagram showing an example of conversion of a dynamic range from HDR into SDR.

Note that in FIG. 5, the vertical axis indicates the dynamic range represented by the value of Stop corresponding to the number of steps of a stop of a lens. The dynamic range is doubled for each increase of one stop.

As an example, the range length of the first dynamic range (HDR) is approximately 13 times the range length of the second dynamic range (SDR).

First, a case where the representative value of brightness is relatively high because most of the video in the target area 103 is the sunny portion video 107 as shown in FIG. 4 will be described.

The CPU 41 of the information processing apparatus 40 compresses the dynamic range of the HDR video signal at a high compression ratio by multiplying the HDR video signal by a negative gain value whose absolute value is larger as the representative value of brightness of the HDR video signal in the target area is higher (brighter). For example, in the case where the HDR video signal is multiplied by −12 dB as the negative gain value, a high brightness portion (up to approximately 400%) of the video signal whose dynamic range is compressed is substantially within the dynamic range (SDR1). Accordingly, in the case where the video of a bright portion in VR video is displayed on the display of the HMD 50, it is possible to suppress a significant decrease in the contrast or occurrence of blown out highlights as much as possible.

Figure 6:
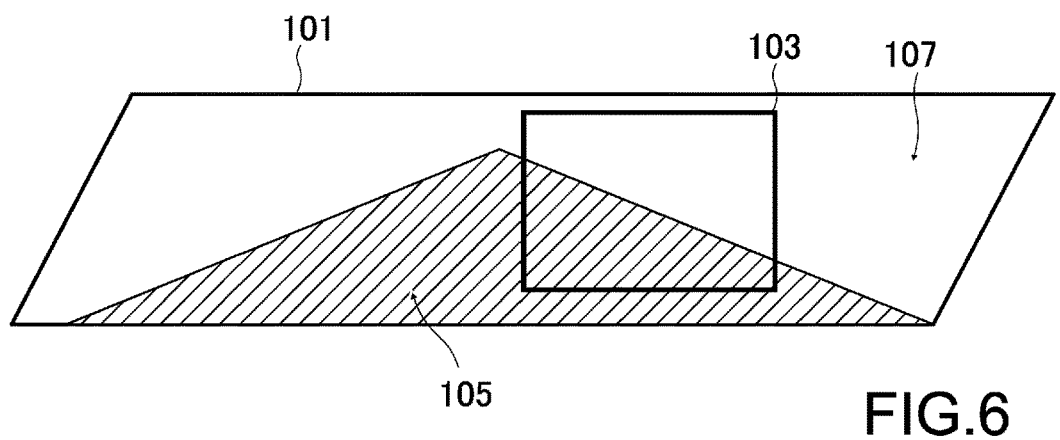
FIG. 6 is a diagram showing a case where the target area 103 in the VR panoramic video 101 includes both a sunny portion and a shaded portion.

Next, an example of conversion of the dynamic range in a case where video in the target area 103 includes the sunny portion video 107 and the shaded portion video 105 as shown in FIG. 6 will be described. In this case, the absolute value of the negative gain value is set to be lower than "12", for example. For example, a case where the HDR video signal is multiplied by −6 dB as the negative gain value is shown. In this case, a moderate brightness portion (approximately 200%) of the video signal whose dynamic range is compressed is within the dynamic range (SDR2).

Figure 7:
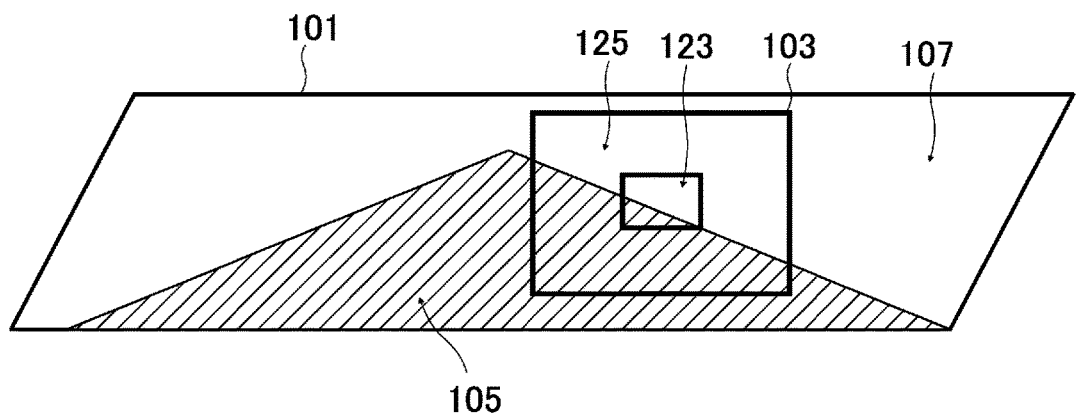
FIG. 7 is a diagram describing another method of calculating a representative value of brightness.

FIG. 7 shows an example of conversion of the dynamic range in the case where the proportion of video of the shaded portion in the target area is further increased. In this case, by further reducing the absolute value of the negative gain value, a low brightness portion (approximately 0% to 100%) of the video signal whose dynamic range is compressed is within the dynamic range (SDR3).

As described above, in this embodiment, the CPU 41 of the information processing apparatus 40 varies, on the basis of the representative value of brightness of the HDR video signal in the target area, the negative gain value to be multiplied by the HDR video signal, compresses the dynamic range of the HDR video signal by multiplying the HDR video signal by the negative gain value, and restricts the dynamic range further to the second dynamic range (SDR), thereby generating an SDR video signal. Accordingly, it is possible to suppress a significant decrease in the contrast or occurrence of blown out highlights as much as possible in the case where the SDR video signal generated from the HDR video signal is displayed on the HMD 50.

Note that color gamut conversion may be performed on the HDR video signal before multiplying the HDR video signal by the negative gain value. For example, in the case where the HDR video signal is of video having a color gamut specified in ITU-R BT.2020, the color gamut is converted into a color gamut specified in ITU-R BT.709.

Modified Example 1

(Modified Example of Method of Calculating Representative Value of Brightness of Target Area)

In the above-mentioned embodiment, the average brightness value of the HDR video signal of the target area is calculated as the representative value of brightness. However, for example, in the case where a shaded portion and a sunny portion coexist as shown in FIG. 7, the brightness average may be obtained by changing the weight between a center portion 123 of the target area 103 and other peripheral portion 125. For example, there is a method of obtaining the brightness average by multiplying the brightness of each pixel of the center portion 123 of the target area 103 by a coefficient P, and multiplying the brightness of each pixel of the peripheral portion 125 of the target area 103 by a coefficient Q of the value smaller than the value of the coefficient P. Since the line of sight of a user is at the center of the target area 103, it is possible to obtain a more appropriate representative value of brightness and a negative gain value by this method.

Modified Example 2

(Gamma Processing on SDR Video Signal)

In the case where a plurality of areas whose average brightness significantly differs in the target area, a part of the low brightness portion and the moderate brightness portion of the video signal whose dynamic range is compressed by multiplying the HDR video signal by the negative gain value is within the second dynamic range (SDR), as shown in FIG. 6, for example. However, since the high brightness portion is outside the second dynamic range (SDR), blown out highlights in the high brightness portion occur.

Figure 8:
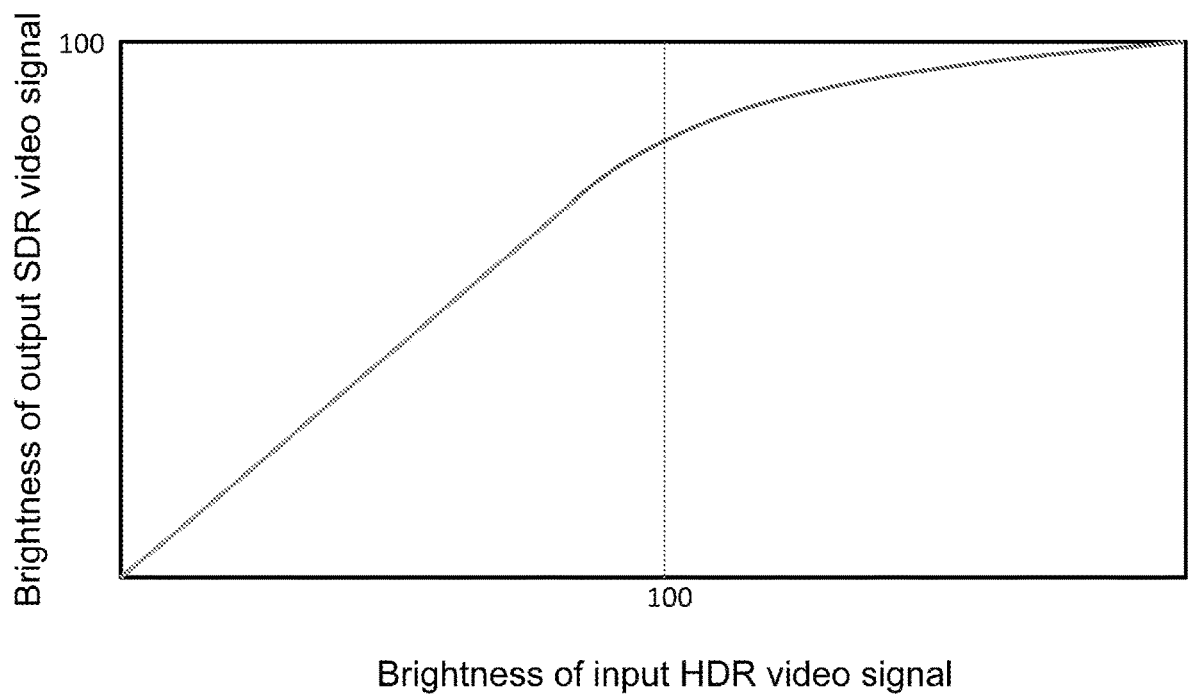
FIG. 8 is a diagram showing an example of gamma characteristics of gamma processing on an SDR video signal generated from an HDR video signal.

In this regard, in the case where a plurality of areas whose average brightness significantly differs in the target area, gamma processing may be performed so as to increase the range for storing the high brightness area when generating the SDR video signal, as shown in FIG. 8, for example.

Further, in order to determine that a plurality of areas whose average brightness significantly differs in the target area, the CPU 41 of the information processing apparatus 40 calculates a brightness histogram of the HDR video signal of the target area, and determines the existence or non-existence of a plurality of areas whose average brightness significantly differs by using a threshold value.

Modified Example 3

(Application to Television)

In the above-mentioned embodiment, the case where the SDR video signal to be displayed on the HMD 50 is generated has been described. However, the present technology is applicable also to a case where an arbitrary portion of VR panoramic video is displayed on a screen of a television, for example.

Figure 9:
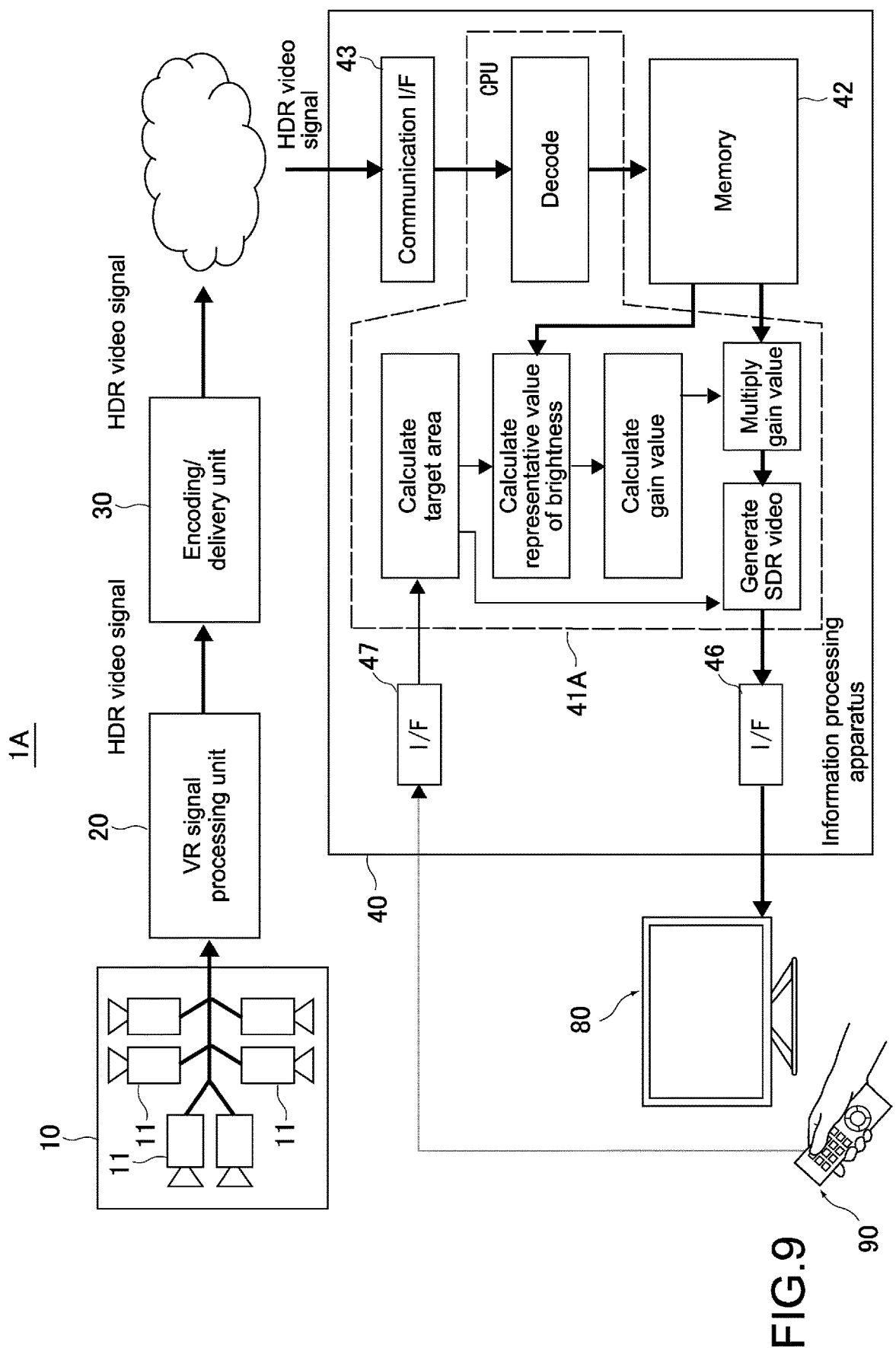
FIG. 9 is a block diagram showing a configuration of a video signal processing system 1A according to a modified example 2 of the present technology.

FIG. 9 is a block diagram showing a configuration of a video signal processing system 1A using a television that displays the SDR video signal.

An information processing apparatus 40A includes a communication interface 46 with a television 80 and a communication interface 47 with a television controller 90. A CPU 41A of the information processing apparatus 40A receives, from the television controller 90, an operation signal for moving the target area or an operation signal of zoom-in/zoom-out, and calculates the target area. Subsequently, the CPU 41A of the information processing apparatus 40A calculates the representative value of brightness of the HDR video signal of the calculated target area, calculates the negative gain value, and multiplies the HDR video signal by the negative gain value. Subsequently, the CPU 41A of the information processing apparatus 40A generates the SDR video signal from the video signal whose dynamic range is compressed by the multiplication by the negative gain value, and performs control to cut out the SDR video signal of an arbitrary display area including the target area from the generated SDR video signal and supply the cut out SDR video signal to the television 80.

The present technology is applicable also to another apparatus including a display.

For example, the present technology is applicable to a case where an arbitrary portion of VR panoramic video is displayed on a display of an apparatus such as a smartphone and a tablet terminal.

Modified Example 4

(Generation of SDR Video Signal from HDR Video Signal by Server)

The present technology is applicable also to a server connected to the network 70.

Figure 10:
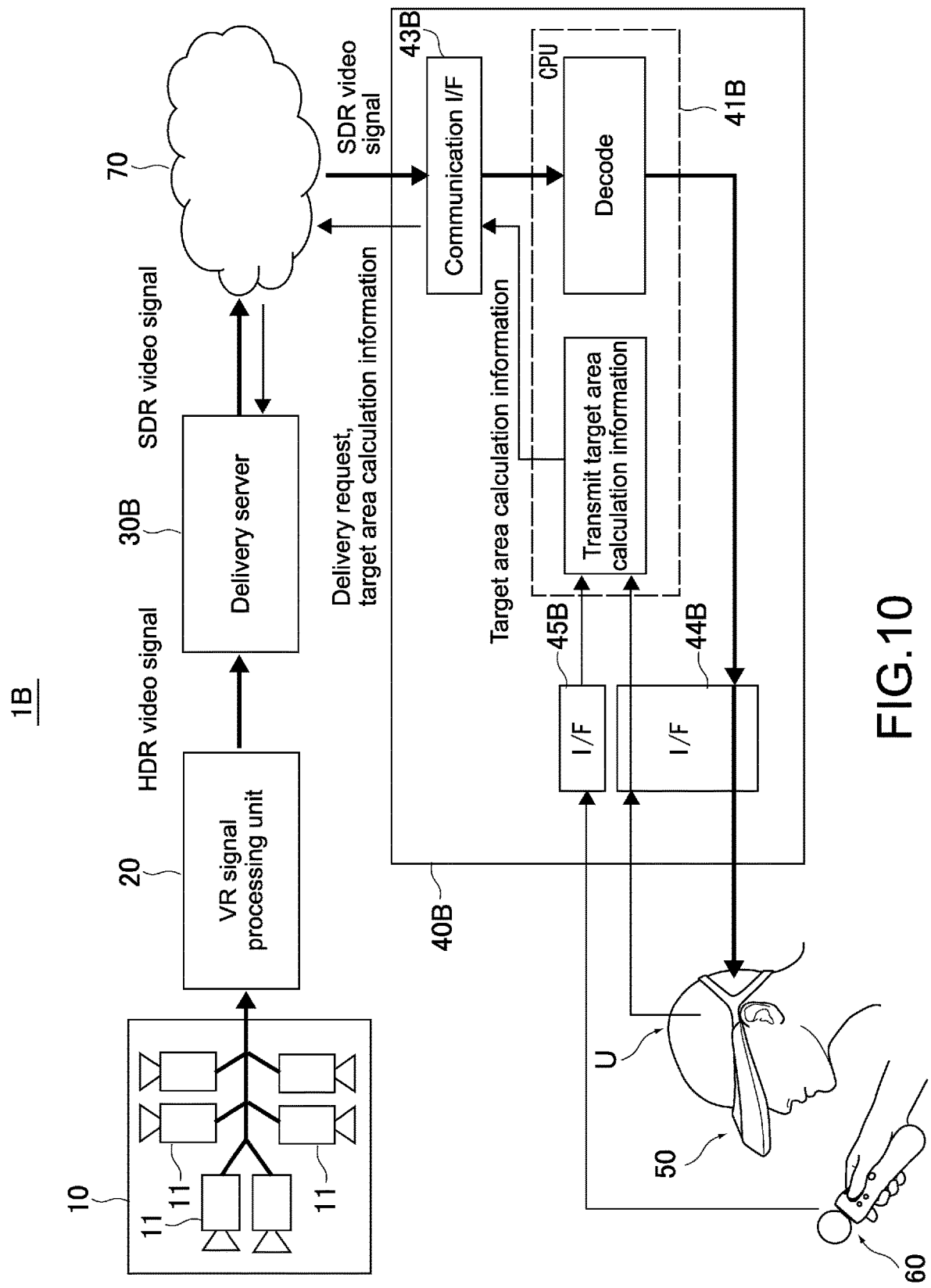
FIG. 10 is a block diagram showing a configuration of a video signal processing system 1B of a modified example 3 of the present technology.
Figure 11:
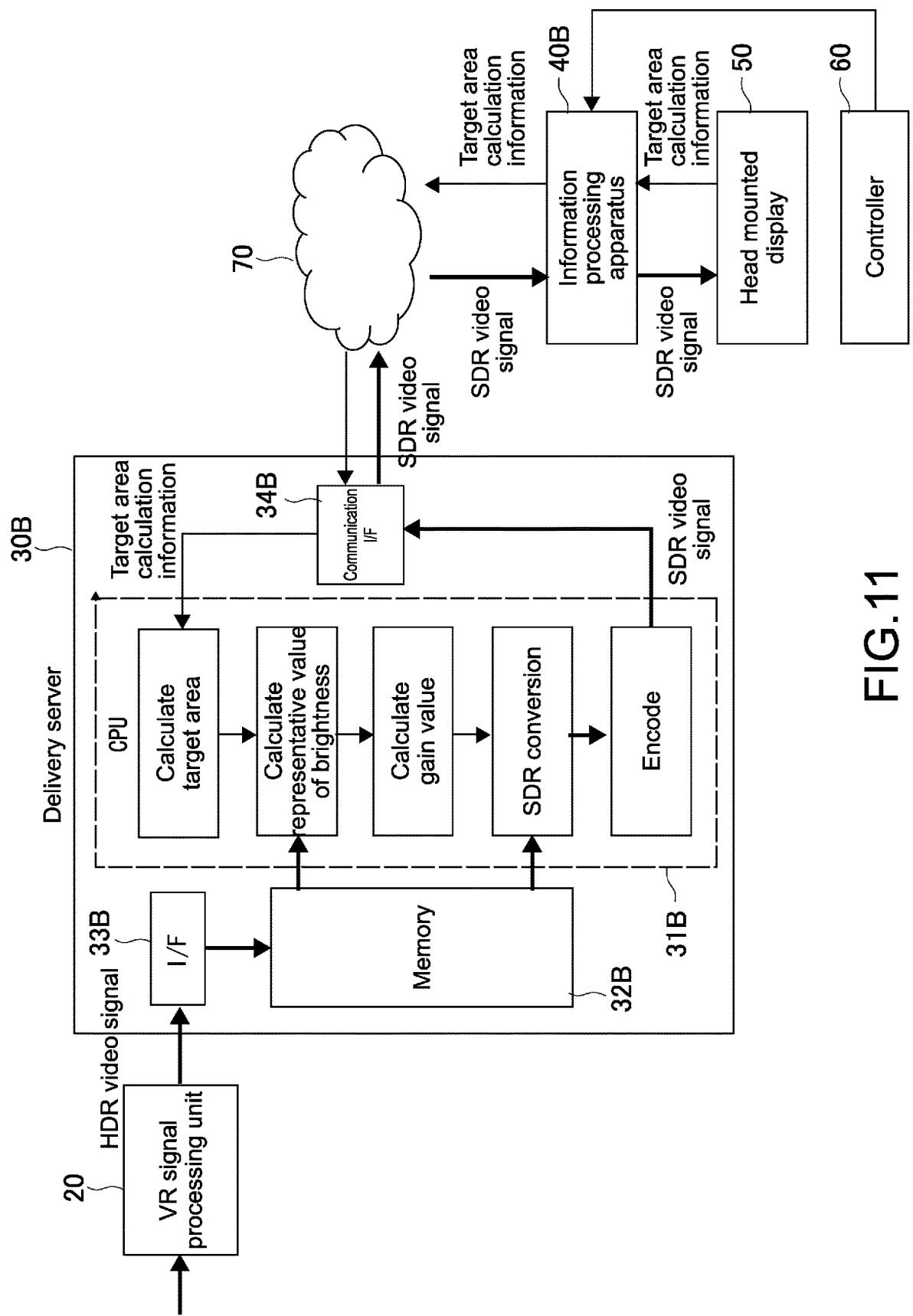
FIG. 11 is a block diagram showing a configuration of a delivery server 30B in the video signal processing system 1B shown in FIG. 10.

FIG. 10 is a block diagram showing a configuration of a video signal processing system 1B that generates, in a delivery server 30B, the SDR video signal to be displayed on the HMD 50 from the HDR video signal. FIG. 11 is a block diagram showing a configuration of the delivery server 30B.

As shown in FIG. 11, the delivery server 30B has a typical computer hardware configuration. The delivery server 30B includes a CPU 31B, a memory 32B, a communication interface 33B with the VR signal processing unit 20, and a communication interface 34B with the network 70.

The memory 32B stores an operating system and an application program to be executed by the CPU 31B. Further, the memory 32B provides a working area for calculation processing by the CPU 31B, a temporary storage area of the HDR video signal of VR video obtained from the VR signal processing unit 20, and the like.

The communication interface 33B with the VR signal processing unit 20 is used for receiving the HDR video signal of VR video from the VR signal processing unit 20.

The communication interface 34B with the network 70 is used for receiving a delivery request or target area calculation information from an information processing apparatus 40B via the network 70, transmitting the SDR video signal of the above-mentioned display area to the information processing apparatus 40B, and the like.

The CPU 31B receives a delivery request of VR video transmitted from the information processing apparatus 40B by using the communication interface 34B with the network 70, generates the SDR video signal of the display area from the HDR video signal of the VR video, and transmits the generated SDR video signal to the information processing apparatus 40B.

In order to calculate the target area, the CPU 31B obtains the target area calculation information periodically transmitted from the information processing apparatus 40B via the network 70, and performs control to calculate the target area on the basis of the obtained target area calculation information.

Further, the CPU 31B of the delivery server 30B calculates a representative value of brightness of the HDR video signal of the calculated target area, and calculates the negative gain value to be multiplied by the HDR video signal on the basis of the representative value of brightness. Subsequently, the CPU 31B of the delivery server 30B performs control to generate the SDR video signal by compressing the dynamic range of the video signal by multiplying the HDR video signal by the calculated negative gain value, and further restricting the dynamic range further to the second dynamic range (SDR).

Further, the CPU 31B of the delivery server 30B performs control to transmits, to the information processing apparatus 40B, the SDR video signal (SDR video signal of the display area) corresponding to a display size including the above-mentioned target area from the generated SDR video signal by using the communication interface 34B with the network 70.

Meanwhile, the information processing apparatus 40B includes a CPU 41B, a communication interface 43B with the network 70, a communication interface 44B with the HMD 50, a communication interface 45B with the HMD controller 60, and a memory (not shown).

The memory stores an operating system and an application program to be executed by the CPU 41B. Further, the memory provides a working area for calculation processing by the CPU 41B, a temporary storage area of the SDR video signal delivered from the delivery server 30B, and the like.

The communication interface 43B with the network 70 is used for transmitting a delivery request of VR video or the target area calculation information to the delivery server 30B via the network 70, and receiving the SDR video signal of the display area transmitted from the delivery server 30B in response to the delivery request.

The communication interface 44B with the HMD 50 is used for transmitting the SDR video signal from the information processing apparatus 40B to the HMD 50, obtaining detection signals of the gyro sensor and the acceleration sensor in the HMD 50, and the like.

The communication interface 45B with the HMD controller 60 is an interface used for obtaining, from the HMD controller 60, an operation signal of zoom-in/zoom-out, an operation signal corresponding to an operation of the selection/determination button, and the like.

The CPU 41B of the information processing apparatus 40B performs processing of transmitting a delivery request of VR video to the delivery server 30B, processing of receiving and decoding the SDR video signal delivered from the delivery server 30B via the network 70, processing of supplying the decoded SDR video signal to the HMD 50, processing of transmitting, to the delivery server 30B, the respective detection signals of the gyro sensor and the acceleration sensor obtained from the HMD 50, the operation signal of zoom-in/zoom-out obtained from the HMD controller 60, and the like, as the target area calculation information, and the like.

Since the configurations of the HMD 50 and the HMD controller 60 are the same as those in the first embodiment, description thereof will be omitted.

(Operation of Video Signal Processing System 1B)

Next, an operation of the video signal processing system 1B according to this modified example will be described.

The CPU 41B of the information processing apparatus 40B transmits a delivery request of VR video to the delivery server 30B via the network 70 by using the communication interface 43B.

In the case of receiving the delivery request of VR video from the information processing apparatus 40B, the CPU 31B of the delivery server 30B stores, in the memory 32B, the HDR video signal of VR video transmitted from the VR signal processing unit 20.

Meanwhile, the CPU 41B of the information processing apparatus 40B obtains the respective detection signals of the gyro sensor and the acceleration sensor from the HMD 50, and transmits these detection signals as the target area calculation information to the delivery server 30B by using the communication interface 43B. Further, at this time, in the case of obtaining the operation signal of zoom-in/zoom-out from the HMD controller 60, the CPU 41B transmits also this operation signal as the target area calculation information to the delivery server 30B by using the communication interface 43B.

In the case of receiving the target area calculation information from the information processing apparatus 40B, the CPU 31B of the delivery server 30B calculates the target area on the basis of the target area calculation information. Further, the CPU 31B of the delivery server 30B calculates a representative value of brightness of the HDR video signal of the calculated target area, and calculates the negative gain value to be multiplied by the HDR video signal on the basis of the representative value of brightness. Next, the CPU 31B of the delivery server 30B generates a video signal, as the SDR video signal, by compressing the dynamic range of the video signal by multiplying the HDR video signal by the calculated negative gain value, and restricting the dynamic range further to the second dynamic range (SDR). Then, the CPU 31B of the delivery server 30B encodes the SDR video signal (SDR video signal of the display area) corresponding to a display size including the above-mentioned target area from the generated SDR video signal into data suitable for network transmission, packetizes the data, and delivers the packetized data to the information processing apparatus 40 via the network 70.

The CPU 41B of the information processing apparatus 40B receives the SDR video signal from the delivery server 30B, decodes the received signal, and transmits the SDR video signal to the HMD 50 by using the communication interface 44B with the HMD 50.

The CPU of the HMD 50 receives the SDR video signal supplied from the information processing apparatus 40, and displays the received SDR video signal on the display.

Another Modified Example

In the above, the detection signals of the gyro sensor and the acceleration sensor of the HMD 50 are used for calculating the target area. However, the any detection method can be used as long as a line-of-sight direction of a user with respect to VR video can be captured. For example, a user's eyeball may be photographed with a camera to detect the line-of-sight direction, and information on the direction to be viewed in the VR image may be specified by the operation of the HMD controller 60.

Application Example

The technology according to the present disclosure is applicable to various products. For example, the technology according to the present disclosure may be applied to an operating room system.

Figure 12:
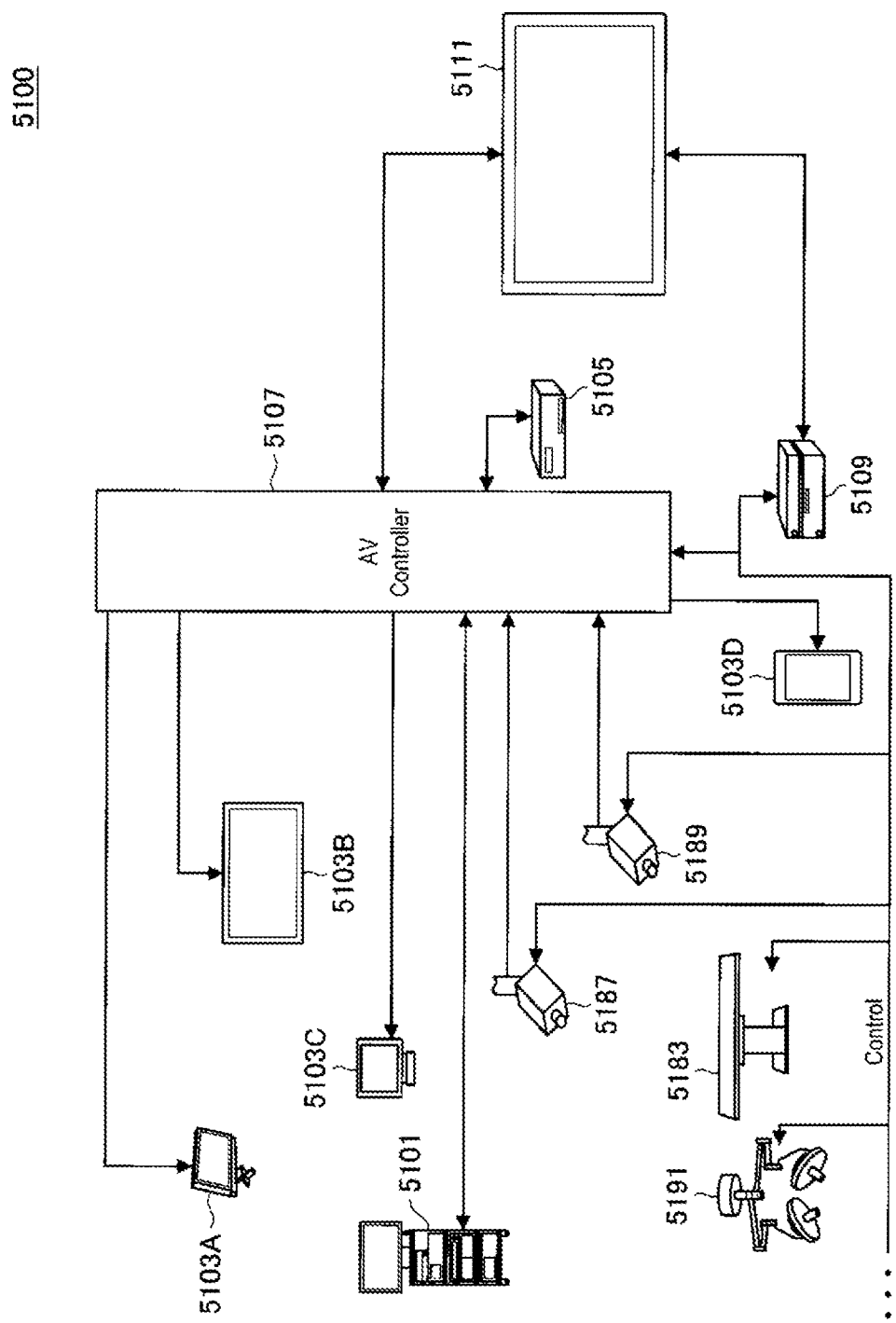
FIG. 12 is a diagram schematically showing a configuration of an entire operating room system.

FIG. 12 is a diagram schematically showing an overall configuration of an operating room system 5100 to which the technology according to the present disclosure is applicable. Referring to FIG. 12, the operating room system 5100 is configured such that a group of apparatuses set in an operating room are capable of cooperating with one another via an audiovisual controller (AV Controller) 5107 and an operating room control apparatus 5109.

Various apparatuses can be set in the operating room. As an example, FIG. 12 shows a group of various apparatuses 5101 for an endoscopic surgery, a ceiling camera 5187 that is provided on a ceiling of the operating room and captures images of hands of a surgeon, an operating room camera 5189 that is provided on the ceiling of the operating room and captures images regarding a state of the entire operating room, a plurality of display apparatuses 5103A to 5103D, a recorder 5105, a patient bed 5183, and an illumination 5191.

Here, of these apparatuses, the apparatus group 5101 belongs to an endoscopic surgery system 5113 to be described later and is constituted of an endoscope, a display apparatus that displays images captured by the endoscope, and the like. The various apparatuses belonging to the endoscopic surgery system 5113 are also called medical equipment. Meanwhile, the display apparatuses 5103A to 5103D, the recorder 5105, the patient bed 5183, and the illumination 5191 are apparatuses that are provided separate from the endoscopic surgery system 5113 and provided in, for example, the operating room. These apparatuses not belonging to the endoscopic surgery system 5113 are also called non-medical equipment. The audiovisual controller 5107 and/or the operating room control apparatus 5109 control/controls operations of these medical equipment and non-medical equipment while cooperating with each other.

The audiovisual controller 5107 collectively controls processing related to image display in the medical equipment and non-medical equipment. Specifically, of the apparatuses provided in the operating room system 5100, the apparatus group 5101, the ceiling camera 5187, and the operating room camera 5189 may be apparatuses that include a function of transmitting information to be displayed during a surgery (hereinafter, also referred to as display information) (hereinafter, also referred to as transmission source apparatuses). Further, the display apparatuses 5103A to 5103D may be apparatuses to which the display information is output (hereinafter, also referred to as output destination apparatuses). Furthermore, the recorder 5105 may be an apparatus corresponding to both the transmission source apparatus and the output destination apparatus. The audiovisual controller 5107 includes a function of controlling operations of the transmission source apparatuses and the output destination apparatuses to acquire display information from the transmission source apparatuses and transmit the display information to the output destination apparatuses to display or record the display information. It should be noted that the display information refers to various images captured during a surgery, various types of information related to the surgery (e.g., body information of patient, past examination result, information on surgical method, etc.), and the like.

Specifically, information on an image of a surgical part in a body cavity of a patient, that has been captured by the endoscope, may be transmitted to the audiovisual controller 5107 from the apparatus group 5101 as the display information. Further, information on an image of hands of a surgeon, that has been captured by the ceiling camera 5187, may be transmitted from the ceiling camera 5187 as the display information. Furthermore, information on an image regarding a state of the entire operating room, that has been captured by the operating room camera 5189, may be transmitted from the operating room camera 5189 as the display information. It should be noted that in a case where other apparatuses including an image pickup function exist in the operating room system 5100, the audiovisual controller 5107 may also acquire information on images captured by the other apparatuses from the other apparatuses as the display information.

Alternatively, for example, information on these images captured in the past is recorded in the recorder 5105 by the audiovisual controller 5107. The audiovisual controller 5107 is capable of acquiring the information on the images captured in the past from the recorder 5105 as the display information. It should be noted that various types of information related to a surgery may be recorded in advance in the recorder 5105.

The audiovisual controller 5107 causes at least one of the display apparatuses 5103A to 5103D as the output destination apparatuses to display the acquired display information (i.e., image captured during surgery or various types of information related to surgery). In the example shown in the figure, the display apparatus 5103A is a display apparatus that is hung from the ceiling of the operating room, the display apparatus 5103B is a display apparatus set on a wall surface of the operating room, the display apparatus 5103C is a display apparatus set on a desk in the operating room, and the display apparatus 5103D is a mobile apparatus including a display function (e.g., tablet PC (Personal Computer)).

Further, although not shown in FIG. 12 the operating room system 5100 may include an apparatus provided outside the operating room. The apparatus provided outside the operating room may be, for example, a server connected to a network structured in and outside a hospital, a PC used by a medical staff, a projector provided in a conference room of the hospital, and the like. In a case where there is such an external apparatus outside the hospital, the audiovisual controller 5107 can also cause the display information to be displayed on a display apparatus in a different hospital via a teleconference system or the like, for remote medical care.

The operating room control apparatus 5109 collectively controls processing except for the processing related to image display in the non-medical equipment. For example, the operating room control apparatus 5109 controls drive of the patient bed 5183, the ceiling camera 5187, the operating room camera 5189, and the illumination 5191.

A centralized operation panel 5111 is provided in the operating room system 5100 so as to enable a user to give an instruction on the image display to the audiovisual controller 5107 or give an instruction on an operation of the non-medical equipment to the operating room control apparatus 5109 via the centralized operation panel 5111. The centralized operation panel 5111 is configured such that a touch panel is provided on a display surface of the display apparatus.

Figure 13:
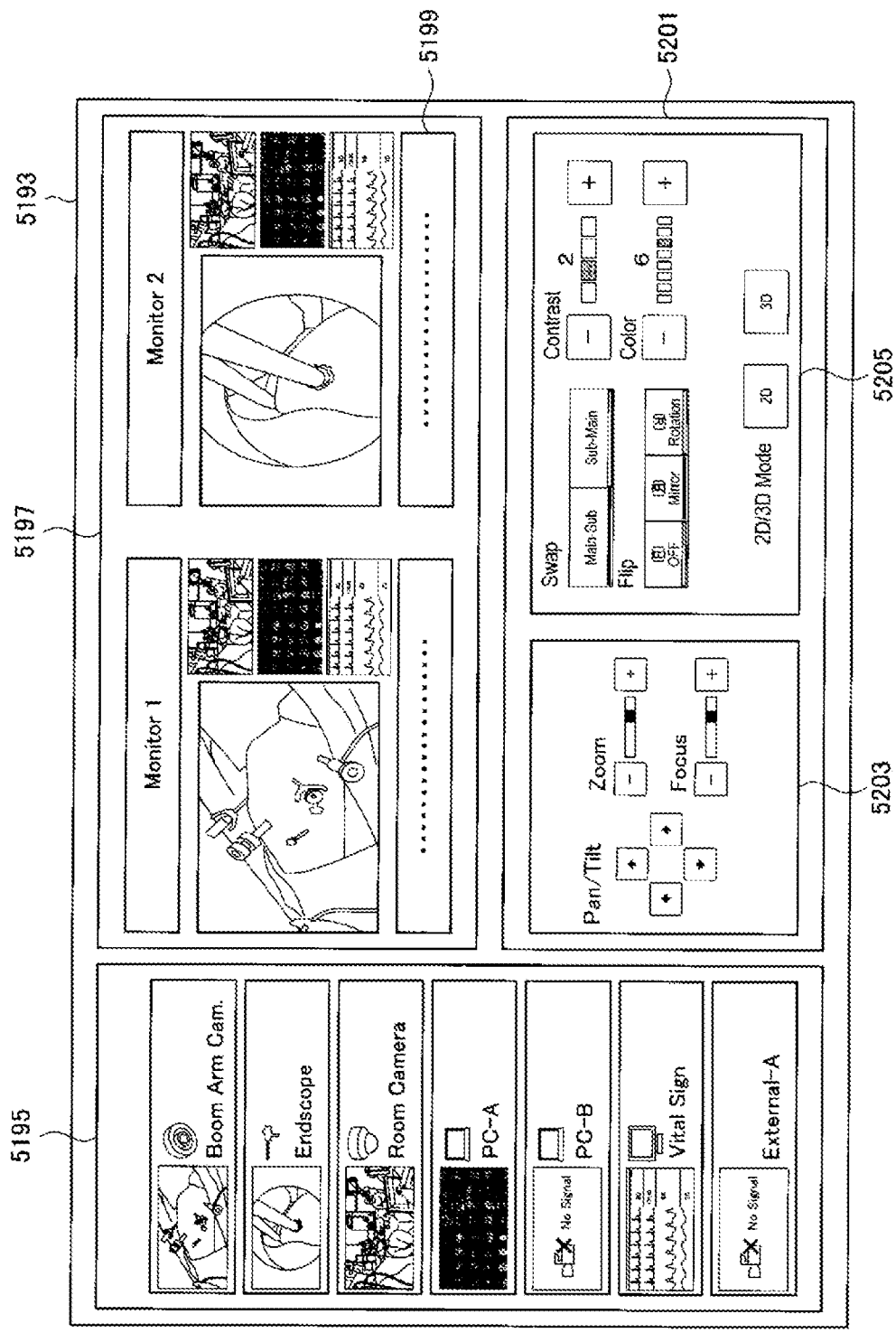
FIG. 13 is a diagram showing a display example of an operation screen in a centralized operation panel.

FIG. 13 is a diagram showing a display example of an operation screen of the centralized operation panel 5111. FIG. 13 shows an example of an operation screen corresponding to a case where two display apparatuses are provided as the output destination apparatuses. Referring to FIG. 13, a transmission source selection area 5195, a preview area 5197, and a control area 5201 are provided in an operation screen 5193.

In the transmission source selection area 5195, the transmission source apparatus provided in the operating room system 5100 and a thumbnail image expressing display information that this transmission source apparatus includes are displayed in association with each other. The user can select display information that he/she wishes to display on the display apparatus from any of the transmission source apparatuses displayed in the transmission source selection area 5195.

In the preview area 5197, previews of screens to be displayed on two display apparatuses (Monitor 1, Monitor 2) as the output destination apparatuses are displayed. In the example shown in the figure, 4 images are PinP-displayed for one display apparatus. The 4 images correspond to display information transmitted from the transmission source apparatuses selected in the transmission source selection area 5195. Of the 4 images, one is displayed relatively largely as a main image, and the remaining 3 images are displayed relatively small as sub-images. By selecting the area where the 4 images are displayed as appropriate, the user can exchange the main image and the sub-images. Further, a status display area 5199 is provided below the area where the 4 images are displayed, and a surgery-related status (e.g., elapsed surgery time, body information of patient, etc.) may be displayed as appropriate in that area.

In the control area 5201, a transmission source operation area 5203 where GUI (Graphical User Interface) components for operating the transmission source apparatus are displayed and an output destination operation area 5205 where GUI components for operating the output destination apparatus are displayed are provided. In the example shown in the figure, GUI components for performing various operations (pan, tilt, and zoom) on a camera in the transmission source apparatus including an image pickup function are provided in the transmission source operation area 5203. By selecting these GUI components as appropriate, the user can control operations of the camera in the transmission source apparatus. It should be noted that although not shown in the figure, in a case where the transmission source apparatus selected in the transmission source selection area 5195 is a recorder (i.e., in a case where images recorded in the past in the recorder are displayed in the preview area 5197), GUI components for performing operations of reproduction, reproduction stop, rewind, fastforward, and the like on the images may be provided in the transmission source operation area 5203.

Further, in the output destination operation area 5205, GUI components for performing various operations (swap, flip, color adjustment, contrast adjustment, and switch between 2D display and 3D display) regarding display on the display apparatus as the output destination apparatus are provided. By selecting these GUI components as appropriate, the user can operate display on the display apparatus.

It should be noted that the operation screen to be displayed on the centralized operation panel 5111 is not limited to the example shown in the figure, and it is also possible for the user to be capable of inputting operations to various apparatuses controllable by the audiovisual controller 5107 and the operating room control apparatus 5109 in the operating room system 5100 via the centralized operation panel 5111.

Figure 14:
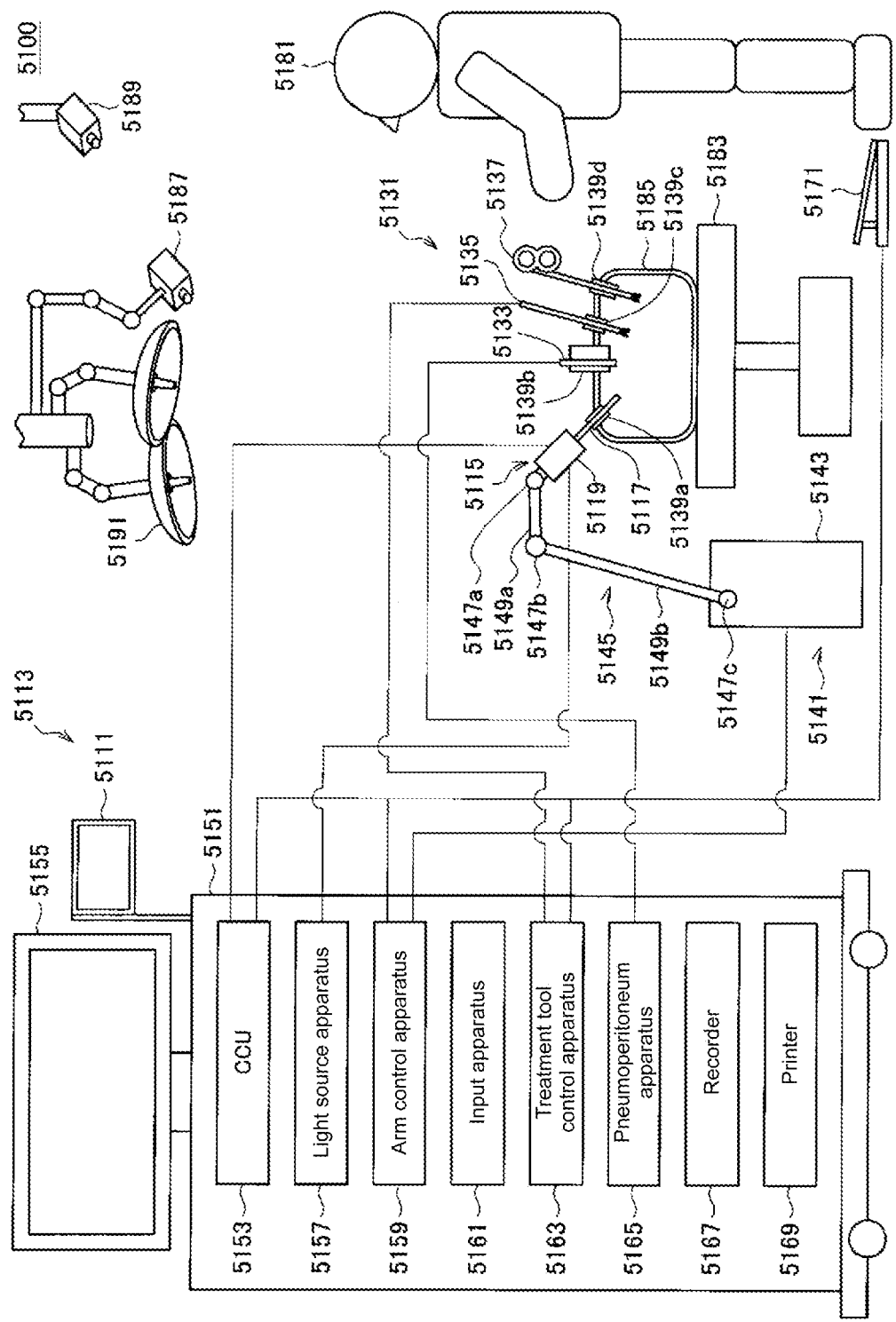
FIG. 14 is a diagram showing an example of a state of surgery to which the operating room system is applied.

FIG. 14 is a diagram showing an example of a state of a surgery to which the operating room system described above is applied. The ceiling camera 5187 and the operating room camera 5189 are provided on the ceiling of the operating room so as to be capable of capturing hands of a surgeon (doctor) 5181 performing a treatment on an affected area of a patient 5185 on the patient bed 5183 and a state of the entire operating room. The ceiling camera 5187 and the operating room camera 5189 may include a magnification adjustment function, a focal distance adjustment function, a photographing direction adjustment function, and the like. The illumination 5191 is provided on the ceiling of the operating room and illuminates at least the hands of the surgeon 5181. The illumination 5191 may be capable of adjusting an illumination light amount, a wavelength (color) of illumination light, a light irradiation direction, and the like as appropriate.

As shown in FIG. 12, the endoscopic surgery system 5113, the patient bed 5183, the ceiling camera 5187, the operating room camera 5189, and the illumination 5191 are connected while being capable of cooperating with one another via the audiovisual controller 5107 and the operating room control apparatus 5109 (not shown in FIG. 14). The centralized operation panel 5111 is provided in the operating room so as to enable the user to operate these apparatuses in the operating room as appropriate via the centralized operation panel 5111 as described above.

Hereinafter, a configuration of the endoscopic surgery system 5113 will be described in detail. As shown in the figure, the endoscopic surgery system 5113 includes an endoscope 5115, other operating tools 5131, a support arm apparatus 5141 that supports the endoscope 5115, and a cart 5151 equipped with various apparatuses for an endoscopic surgery.

In the endoscopic surgery, a plurality of cylindrical perforating tools called trocars 5139*a* to 5139*d* are punctured into an abdominal wall instead of opening the abdomen by cutting the abdominal wall. Then, a lens tube 5117 of the endoscope 5115 and the other operating tools 5131 are inserted into a body cavity of the patient 5185 from the trocars 5139*a* to 5139*d*. In the example shown in the figure, a pneumoperitoneum tube 5133, an energy treatment tool 5135, and forceps 5137 are inserted into the body cavity of the patient 5185 as the other operating tools 5131. Further, the energy treatment tool 5135 is a treatment tool for performing tissue incision and ablation, sealing of blood vessels, or the like by a high-frequency current or ultrasonic vibration. It should be noted that the operating tools 5131 shown in the figure are mere examples, and various operating tools generally used in an endoscopic surgery, such as tweezers and a retractor, may be used as the operating tools 5131, for example.

An image of a surgical part in the body cavity of the patient 5185, that has been captured by the endoscope 5115, is displayed on a display apparatus 5155. The surgeon 5181 uses the energy treatment tool 5135 and the forceps 5137 to perform a treatment such as ablation of an affected part, for example, while watching the image of the surgical part displayed on the display apparatus 5155 in real time. It should be noted that although not shown in the figure, the pneumoperitoneum tube 5133, the energy treatment tool 5135, and the forceps 5137 are supported by the surgeon 5181, an assistant, and the like during the surgery.

(Support Arm Apparatus)

The support arm apparatus 5141 includes an arm portion 5145 that extends from a base portion 5143. In the example shown in the figure, the arm portion 5145 includes joint portions 5147*a*, 5147*b*, and 5147*c* and links 5149*a* and 5149*b* and is driven under control of an arm control apparatus 5159. The endoscope 5115 is supported by the arm portion 5145 such that its position and posture are controlled. Accordingly, stable position fixing of the endoscope 5115 can be realized.

(Endoscope)

The endoscope 5115 includes the lens tube 5117 whose area that is a predetermined length from a tip end is inserted into the body cavity of the patient 5185, and a camera head 5119 connected to a base end of the lens tube 5117. Although the endoscope 5115 configured as a so-called hard mirror including a hard lens tube 5117 is illustrated in the example shown in the figure, the endoscope 5115 may alternatively be configured as a so-called flexible mirror including a flexible lens tube 5117.

An opening into which an objective lens is fit is provided at a tip end of the lens tube 5117. A light source apparatus 5157 is connected to the endoscope 5115, and light generated by the light source apparatus 5157 is guided to the tip end of the lens tube 5117 by a lightguide extending inside the lens tube 5117 to be irradiated toward an observation target in the body cavity of the patient 5185 via the objective lens. It should be noted that the endoscope 5115 may be a direct view endoscope, a perspective view endoscope, or a side view endoscope.

An optical system and an image pickup device are provided inside the camera head 5119, and reflected light from the observation target (observation light) is collected in the image pickup device by the optical system. The observation light is photoelectrically converted by the image pickup device so as to generate electric signals corresponding to the observation light, that is, image signals corresponding to an observation image. The image signals are transmitted to a camera control unit (CCU: Camera Control Unit) 5153 as RAW data. It should be noted that by driving the optical system as appropriate, the camera head 5119 is equipped with a magnification function and a focal distance adjustment function.

It should be noted that for supporting a stereoscopic view (3D display) or the like, for example, a plurality of image pickup devices may be provided in the camera head 5119. In this case, a plurality of relay optical systems are provided inside the lens tube 5117 for guiding observation light to each of the plurality of image pickup devices.

(Various Apparatuses Mounted on Cart)

The CCU 5153 includes a CPU (Central Processing Unit), a GPU (Graphics Processing Unit), and the like and collectively controls operations of the endoscope 5115 and the display apparatus 5155. Specifically, the CCU 5153 carries out various types of image processing for displaying an image based on the image signals, such as development processing (demosaic processing), on the image signals received from the camera head 5119. The CCU 5153 provides the image signals subjected to the image processing to the display apparatus 5155. Further, the audiovisual controller 5107 shown in FIG. 12 is connected to the CCU 5153. The CCU 5153 also provides the image signals subjected to the image processing to the audiovisual controller 5107. Further, the CCU 5153 transmits a control signal to the camera head 5119 to control drive thereof. The control signal may include information related to image pickup conditions such as a magnification and a focal distance. The information related to the image pickup conditions may be input via an input apparatus 5161 or may be input via the centralized operation panel 5111 described above.

The display apparatus 5155 displays an image based on the image signals subjected to the image processing by the CCU 5153 under control of the CCU 5153. In a case where the endoscope 5115 is an endoscope that supports high-resolution photographing, such as 4K (horizontal pixel count 3840*vertical pixel count 2160) and 8K (horizontal pixel count 7680*vertical pixel count 4320), and/or supports 3D display, for example, a display apparatus capable of performing high-resolution display and/or a display apparatus capable of performing 3D display is/are used as the display apparatus 5155. In the case where high-resolution photographing of 4K, 8K, or the like is supported, a more sense of immersion can be obtained by using a display apparatus having a size of 55 inches or more as the display apparatus 5155. Further, a plurality of display apparatuses 5155 having different resolutions and sizes may be provided depending on purposes.

The light source apparatus 5157 includes a light source such as an LED (Light Emitting Diode), for example, and supplies illumination light to the endoscope 5115 when photographing a surgical part.

The arm control apparatus 5159 includes a processor such as a CPU, for example, and is operated in accordance with a predetermined program so as to control drive of the arm portion 5145 of the support arm apparatus 5141 by a predetermined control method.

The input apparatus 5161 is an input interface with respect to the endoscopic surgery system 5113. The user is capable of inputting various types of information and inputting instructions with respect to the endoscopic surgery system 5113 via the input apparatus 5161. For example, the user inputs various types of surgery-related information such as body information of a patient and information on a surgical method in a surgery via the input apparatus 5161. Moreover, for example, the user inputs an instruction to drive the arm portion 5145, an instruction to change the image pickup conditions (type of irradiation light, magnification, focal distance, etc.) of the endoscope 5115, an instruction to drive the energy treatment tool 5135, and the like via the input apparatus 5161.

The type of input apparatus 5161 is not limited, and the input apparatus 5161 may be various well-known input apparatuses. As the input apparatus 5161, for example, a mouse, a keyboard, a touch panel, a switch, a foot switch 5171 and/or a lever, and the like are applicable. In a case where a touch panel is used as the input apparatus 5161, the touch panel may be provided on a display surface of the display apparatus 5155.

Alternatively, the input apparatus 5161 is, for example, a device worn by the user, such as a glasses-type wearable display and an HMD (Head Mounted Display), and various inputs are performed in accordance with gestures or lines of sight of the user detected by these devices. Further, the input apparatus 5161 includes a camera capable of detecting movements of the user, and various inputs are performed in accordance with a gesture or line of sight of the user detected from a video captured by this camera. Furthermore, the input apparatus 5161 includes a microphone capable of picking up a voice of the user, and various inputs are performed by audio input via this microphone. By configuring the input apparatus 5161 such that various types of information can be input in a non-contact manner in this way, it becomes possible particularly for a user belonging to a clean area (e.g., surgeon 5181) to operate an apparatus belonging to an unclean area in a non-contact manner. Furthermore, since the user can operate the apparatus without releasing the surgical tool at hand, convenience for the user is improved.

A processing tool control apparatus 5163 controls drive of the energy treatment tool 5135 for tissue ablation and incision, sealing of blood vessels, or the like. For the purpose of securing eyesight of the endoscope 5115 and securing a work space of a surgeon, a pneumoperitoneum apparatus 5165 pumps in gas in the body cavity of the patient 5185 via the pneumoperitoneum tube 5133 so as to blow it up. A recorder 5167 is an apparatus capable of recording various types of surgery-related information. A printer 5169 is an apparatus capable of printing the various types of surgery-related information in various formats such as a text, an image, and a graph.

Hereinafter, a particularly characteristic configuration of the endoscopic surgery system 5113 will be described in more detail.

(Support Arm Apparatus)

The support arm apparatus 5141 includes the base portion 5143 as a base and the arm portion 5145 extending from the base portion 5143. In the example shown in the figure, the arm portion 5145 includes the plurality of joint portions 5147a, 5147b, and 5147c and the plurality of links 5149a and 5149b coupled by the joint portion 5147b. Meanwhile, FIG. 14 shows a simplified configuration of the arm portion 5145 for simplification. In actuality, the shape, number, and arrangement of the joint portions 5147a to 5147c and links 5149a and 5149b, a direction of rotation axes of the joint portions 5147a to 5147c, and the like can be set as appropriate so that a desired degree of freedom is given to the arm portion 5145. For example, the arm portion 5145 can favorably be configured to have a degree of freedom of 6 or more. Accordingly, the endoscope 5115 can be moved freely within a movable range of the arm portion 5145, and thus it becomes possible to insert the lens tube 5117 of the endoscope 5115 into the body cavity of the patient 5185 from a desired direction.

An actuator is provided in the joint portions 5147a to 5147c, and the joint portions 5147a to 5147c are configured to be rotatable about a predetermined rotation axis by drive of the actuator. By the drive of the actuator being controlled by the arm control apparatus 5159, a rotation angle of each of the joint portions 5147a to 5147c is controlled, and drive of the arm portion 5145 is controlled. Accordingly, control of the position and posture of the endoscope 5115 can be realized. At this time, the arm control apparatus 5159 is capable of controlling drive of the arm portion 5145 by various well-known control methods such as force control and position control.

For example, the surgeon 5181 may perform an operation input as appropriate via the input apparatus 5161 (including foot switch 5171) so that the drive of the arm portion 5145 is controlled as appropriate by the arm control apparatus 5159 in accordance with the operation input and the position and posture of the endoscope 5115 are controlled. By this control, after being moved from an arbitrary position to an arbitrary position, the endoscope 5115 at the tip end of the arm portion 5145 can be fixedly supported at that position. It should be noted that the arm portion 5145 may be operated by a so-called master-slave system. In this case, the arm portion 5145 can be remotely operated by the user via the input apparatus 5161 set at a location away from the operating room.

Further, in a case of applying force control, the arm control apparatus 5159 may perform so-called power assist control so as to drive the actuator of each of the joint portions 5147a to 5147c such that, when applied with an external force from the user, the arm portion 5145 moves smoothly in accordance with that external force. Accordingly, in moving the arm portion 5145 while directly touching it, the user can move the arm portion 5145 with a relatively-small force. Therefore, it becomes possible to move the endoscope 5115 more intuitively and with a more simple operation and improve user convenience.

Here, in general, the endoscope 5115 is supported by a doctor called scopist in the endoscopic surgery. In contrast, by using the support arm apparatus 5141, the position of the endoscope 5115 can be more-positively fixed without relying on hands of human beings, and thus it becomes possible to stably obtain an image of a surgical part and smoothly perform a surgery.

It should be noted that the arm control apparatus 5159 does not necessarily need to be provided in the cart 5151. Further, the arm control apparatus 5159 does not necessarily need to be a single apparatus. For example, the arm control apparatus 5159 may be provided in each of the joint portions 5147a to 5147c of the arm portion 5145 of the support arm apparatus 5141, and drive control of the arm portion 5145 may be realized by the plurality of arm control apparatuses 5159 cooperating with one another.

(Light Source Apparatus)

The light source apparatus 5157 supplies irradiation light to the endoscope 5115 when photographing the surgical part. The light source apparatus 5157 includes a white light source constituted of an LED, a laser light source, or a combination of these, for example. At this time, in a case where the white light source is constituted of a combination of RGB laser light sources, an output intensity and output timing of each color (each wavelength) can be controlled highly accurately, and thus white balance adjustment of the captured image can be performed in the light source apparatus 5157. Also in this case, by time-divisionally irradiating laser light from the respective RGB laser light sources onto an observation target and controlling drive of the image pickup device of the camera head 5119 in synchronization with the irradiation timings, images respectively corresponding to RGB can be captured time-divisionally. By this method, a color image can be obtained without providing a color filter in the image pickup device.

Further, the light source apparatus 5157 may be controlled to be driven such that an intensity of output light is changed every predetermined time. By controlling drive of the image pickup device of the camera head 5119 and time-divisionally acquiring images in synchronization with the timings at which the light intensity is changed and synthesizing the images, an image having a high dynamic range without so-called blackening or overexposure can be generated.

Moreover, the light source apparatus 5157 may be configured to be capable of supplying light of a predetermined wavelength band corresponding to a special light observation. In the special light observation, for example, by irradiating light having a narrower band than that of irradiation light used in a normal observation (i.e., white light) using light absorption wavelength dependency in a body system, so-called narrow band imaging in which a predetermined tissue such as a blood vessel on a mucous surface layer is photographed with a high contrast is carried out. Alternatively, in the special light observation, fluorescent observation in which an image is obtained by fluorescence generated by irradiating excitation light may be carried out. In the fluorescent observation, an observation in which excitation light is irradiated onto a body system so as to observe fluorescence from the body system (autogenic fluorescent observation), an observation in which a reagent such as indocyanine green (ICG) is locally injected into a body system, and excitation light corresponding to a fluorescent wavelength of that reagent is irradiated onto the body system so as to obtain a fluorescent image, or the like can be carried out. The light source apparatus 5157 can be configured to be capable of supplying narrow band light and/or excitation light corresponding to such a special light observation.

(Camera Head and CCU)

Figure 15:
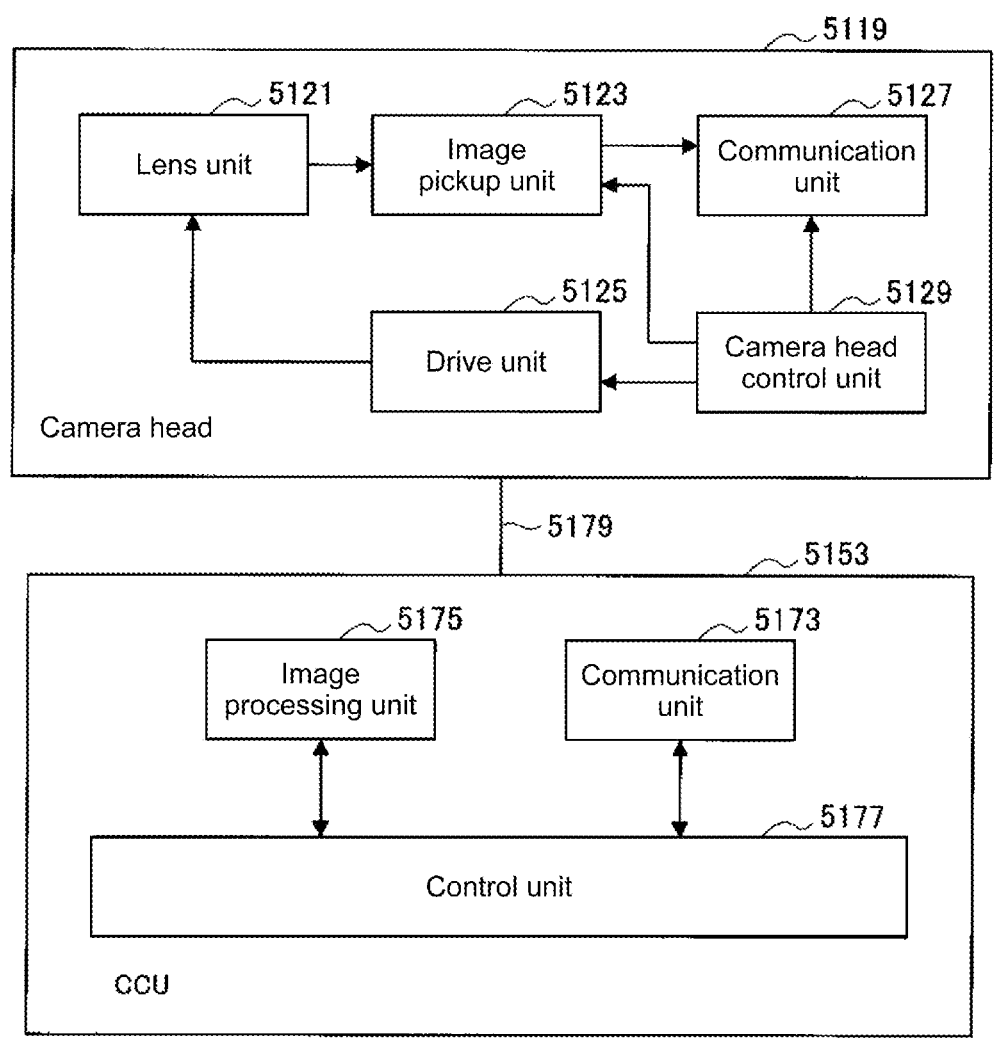
FIG. 15 is a block diagram showing an example of a functional configuration of a camera head and a CCU shown in FIG. 14.

Referring to FIG. 15, functions of the camera head 5119 of the endoscope 5115 and the CCU 5153 will be described in more detail. FIG. 15 is a block diagram showing an example of a functional configuration of the camera head 5119 and the CCU 5153 shown in FIG. 14.

Referring to FIG. 15, the camera head 5119 includes, as functions thereof, a lens unit 5121, an image pickup unit 5123, a drive unit 5125, a communication unit 5127, and a camera head control unit 5129. Further, the CCU 5153 includes, as functions thereof, a communication unit 5173, an image processing unit 5175, and a control unit 5177. The camera head 5119 and the CCU 5153 are connected while being mutually communicable via a transmission cable 5179.

First, the functional configuration of the camera head 5119 will be described. The lens unit 5121 is an optical system provided at a connection portion that connects it to the lens tube 5117. Observation light taken in from the tip end of the lens tube 5117 is guided to the camera head 5119 and enters the lens unit 5121. The lens unit 5121 is configured by combining a plurality of lenses including a zoom lens and a focus lens. The lens unit 5121 has optical characteristics thereof adjusted so that the observation light is collected on a light-receiving surface of an image pickup device of the image pickup unit 5123. Further, the zoom lens and the focus lens are configured such that positions thereof on an optical axis are movable for adjusting a magnification and focal point of a captured image.

The image pickup unit 5123 includes the image pickup device and is arranged subsequent to the lens unit 5121. The observation light that has passed the lens unit 5121 is collected on the light-receiving surface of the image pickup device, and image signals corresponding to an observation image are generated by photoelectric conversion. The image signals generated by the image pickup unit 5123 are provided to the communication unit 5127.

The image pickup device configuring the image pickup unit 5123 is, for example, a CMOS (Complementary Metal Oxide Semiconductor)-type image sensor, and a sensor that includes a Bayer array and is capable of color-photographing is used. It should be noted that a sensor capable of supporting photographing of a high-resolution image of 4K or more, for example, may be used as the image pickup device. Since an image of a surgical part can be obtained with a high resolution, the surgeon 5181 can grasp a state of the surgical part more specifically and smoothly proceed the surgery.

Further, the image pickup device configuring the image pickup unit 5123 is configured to include a pair of image pickup devices for respectively acquiring image signals for a right eye and a left eye that correspond to 3D display. By performing 3D display, the surgeon 5181 can more accurately grasp a depth of a body tissue at the surgical part. It should be noted that in a case where the image pickup unit 5123 is of a multiple plate type, a plurality of lens units 5121 are provided in correspondence with the respective image pickup devices.

Further, the image pickup unit 5123 does not necessarily need to be provided in the camera head 5119. For example, the image pickup unit 5123 may be provided right after the objective lens inside the lens tube 5117.

The drive unit 5125 includes an actuator and causes the zoom lens and focus lens of the lens unit 5121 to move only a predetermined distance along the optical axis under control of the camera head control unit 5129. Accordingly, the magnification and focal point of the captured image obtained by the image pickup unit 5123 are adjusted appropriately.

The communication unit 5127 includes a communication apparatus for exchanging various types of information with the CCU 5153. The communication unit 5127 transmits, as RAW data, the image signals obtained from the image pickup unit 5123 to the CCU 5153 via the transmission cable 5179. At this time, it is favorable to transmit the image signals by optical communication for displaying the captured image of the surgical part with a low latency. This because, since the surgeon 5181 performs a surgery while observing a state of the affected part using the captured image during the surgery, displaying a moving image of the surgical part as close to real time as possible is demanded for a more-positive and safer surgery. In a case where optical communication is performed, a photoelectric conversion module that converts electric signals into optical signals is provided in the communication unit 5127. After the image signals are converted into optical signals by the photoelectric conversion module, the signals are transmitted to the CCU 5153 via the transmission cable 5179.

Further, the communication unit 5127 receives a control signal for controlling drive of the camera head 5119 from the CCU 5153. The control signal includes, for example, information related to image pickup conditions, such as information to the effect of designating a frame rate of a captured image, information to the effect of designating an exposure value during photographing, and/or information to the effect of designating a magnification and focal point of a captured image. The communication unit 5127 provides the received control signal to the camera head control unit 5129. It should be noted that the control signal from the CCU 5153 may also be transmitted by optical communication. In this case, a photoelectric conversion module that converts optical signals into electric signals is provided in the communication unit 5127, and after the control signal is converted into an electric signal by the photoelectric conversion module, the signal is transmitted to the camera head control unit 5129.

It should be noted that the image pickup conditions described above such as a frame rate, an exposure value, a magnification, and a focal point are automatically set by the control unit 5177 of the CCU 5153 on the basis of the acquired image signals. In other words, a so-called AE (Auto Exposure) function, AF (Auto Focus) function, and AWB (Auto White Balance) function are provided in the endoscope 5115.

The camera head control unit 5129 controls the drive of the camera head 5119 on the basis of the control signal from the CCU 5153 received via the communication unit 5127. For example, the camera head control unit 5129 controls the drive of the image pickup device of the image pickup unit 5123 on the basis of the information to the effect of designating a frame rate of a captured image and/or the information to the effect of designating an exposure during photographing. Further, for example, the camera head control unit 5129 moves the zoom lens and focal lens of the lens unit 5121 as appropriate via the drive unit 5125 on the basis of the information to the effect of designating a magnification and focal point of a captured image. The camera head control unit 5129 may further include a function of storing information for identifying the lens tube 5117 or the camera head 5119.

It should be noted that by arranging the configuration including the lens unit 5121, the image pickup unit 5123, and the like in a sealed structure having high airtightness and waterproof property, a resistance to autoclave sterilization processing can be given to the camera head 5119.

Next, the functional configuration of the CCU 5153 will be described. The communication unit 5173 includes a communication apparatus for exchanging various types of information with the camera head 5119. The communication unit 5173 receives image signals transmitted from the camera head 5119 via the transmission cable 5179. At this time, as described above, the image signals can be transmitted favorably by optical communication. In this case, a photoelectric conversion module that converts optical signals into electric signals is provided in the communication unit 5173 in accordance with the optical communication. The communication unit 5173 provides the image signals converted into electric signals to the image processing unit 5175.

Further, the communication unit 5173 transmits a control signal for controlling the drive of the camera head 5119 to the camera head 5119. This control signal may also be transmitted by optical communication.

The image processing unit 5175 carries out various types of image processing on the image signals as RAW data transmitted from the camera head 5119. The image processing include, for example, various types of well-known signal processing such as development processing, high image quality processing (band emphasis processing, super-resolution processing, NR (Noise reduction) processing, hand movement correction processing, etc.), and/or enlargement processing (electronic zoom processing). Further the image processing unit 5175 carries out detection processing on the image signals for performing AE, AF, and AWB.

The image processing unit 5175 includes a processor such as a CPU and a GPU. By the processor operating in accordance with a predetermined program, the image processing and detection processing described above can be carried out. It should be noted that in a case where the image processing unit 5175 includes a plurality of GPUs, the image processing unit 5175 divides the information related to the image signals as appropriate and carries out image processing by the plurality of GPUs in parallel.

The control unit 5177 carries out various types of control related to photographing of a surgical part by the endoscope 5115 and display of a captured image. For example, the control unit 5177 generates a control signal for controlling the drive of the camera head 5119. At this time, in a case where the image pickup conditions are input by the user, the control unit 5177 generates a control signal on the basis of the user input. Alternatively, in a case where the AE function, the AF function, and the AWB function are provided in the endoscope 5115, the control unit 5177 calculates optimal exposure value, focal distance, and white balance as appropriate in accordance with a result of the detection processing by the image processing unit 5175, to generate a control signal.

Further, the control unit 5177 causes the display apparatus 5155 to display the image of the surgical part on the basis of the image signals subjected to the image processing by the image processing unit 5175. At this time, the control unit 5177 recognizes various objects in the surgical part image using various image recognition technologies. For example, the control unit 5177 detects an edge shape, color, and the like of an object included in the surgical part image so as to be capable of recognizing the operating tool such as forceps, a specific body part, bleeding, mist when using the energy treatment tool 5135, and the like. In displaying the surgical part image on the display apparatus 5155, the control unit 5177 superimposes various types of surgery support information on the surgical part image using a result of the recognition. By superimposing the surgery support information and presenting it to the surgeon 5181, it becomes possible to proceed with more-positive and safer surgery.

The transmission cable 5179 connecting the camera head 5119 and the CCU 5153 is an electric signal cable that supports communication of electric signals, an optical fiber that supports optical communication, or a composite cable thereof.

Here, although communication is performed via wires using the transmission cable 5179 in the example shown in the figure, communication between the camera head 5119 and the CCU 5153 may be wireless communication. In a case where communication between those two is carried out wirelessly, there is no need to provide the transmission cable 5179 in the operating room, so a situation where movements of medical staffs in the operating room are inhibited by the transmission cable 5179 can be eliminated.

Heretofore, an example of the operating room system 5100 to which the technology according to the present disclosure is applicable has been described. It should be noted that although the case where a medical system to which the operating room system 5100 is applied is the endoscopic surgery system 5113 has been described as an example herein, the configuration of the operating room system 5100 is not limited to the example described above. For example, the operating room system 5100 may be applied to a diagnostic flexible endoscope system or a microscopic surgery system instead of the endoscopic surgery system 5113.

Figure 16:
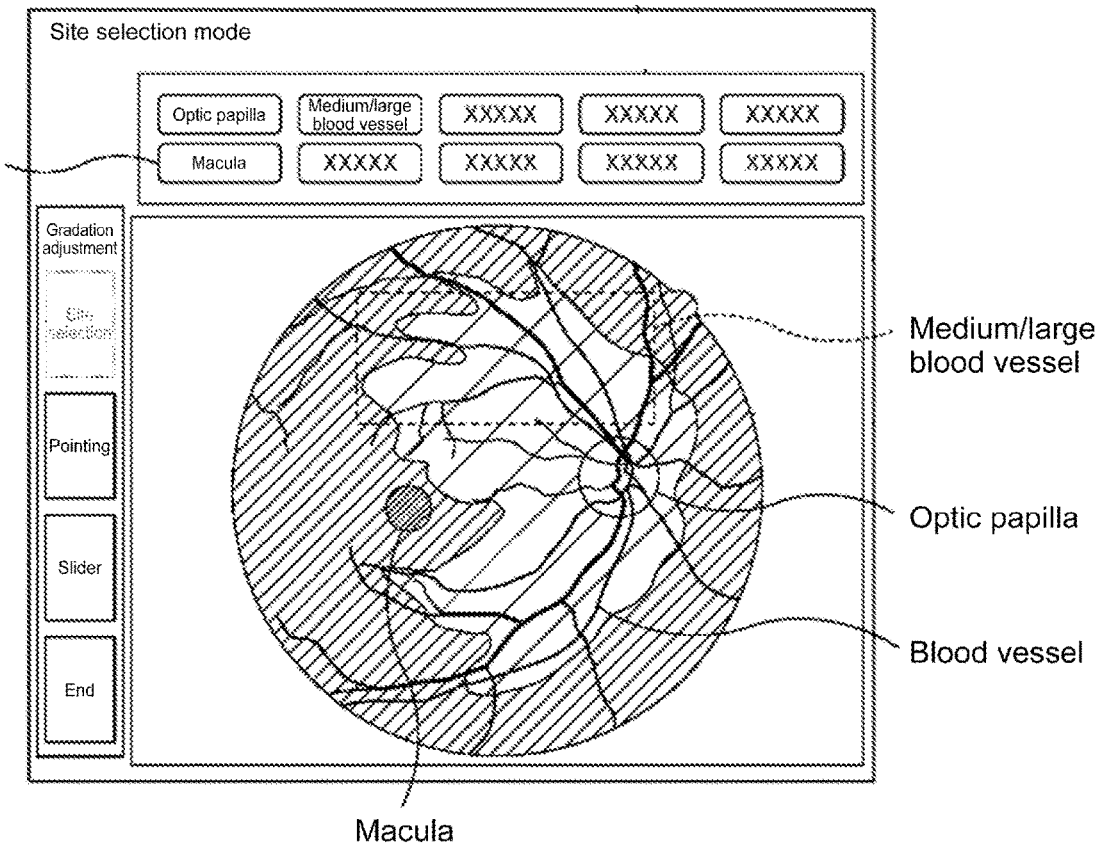
FIG. 16 is a diagram showing another display example of the operation screen in the centralized operation panel.

Of the configurations described above, the technology according to the present disclosure can favorably be applied to the control unit 5177 of the CCU 5153. Specifically, it is possible to set a focus area in a surgical part image as a target area, calculate a representative value of brightness of an HDR video signal in this target area, compress a dynamic range of a video signal by multiplying the HDR video signal by a negative gain value determined on the basis of this representative value of brightness, and restrict the dynamic range further to a second dynamic range (SDR), thereby generating an SDR video signal. By applying the technology according to the present disclosure to the control unit 5177 of the CCU 5153 in this way, it becomes possible to present an image particularly suited for an eyesight of a surgeon, when checking the surgical part image using a head mounted display or checking the surgical part image in an SDR monitor in the dark. Further, in the surgical part image, brightness suited for the focus area may exist. In such a case, it is possible to cause icons 5198 for designating focus sites as shown in FIG. 16 (funduscopic image is shown as an example), for example, to be displayed on the operation screen 5193 so as to enable a target area to be set by selecting this icon 5198. At this time, an SDR video signal suited for the focus site can be generated by using a negative gain value determined in advance for each target area.

It should be noted that the present technology may take the following configurations.

(1) A video signal processing apparatus, including:
  a first interface configured to obtain a first video signal imaged within a first dynamic range;
  a second interface configured to obtain information for specifying a partial area of the obtained first video signal; and
  an arithmetic processing circuit configured
  to calculate a representative value of brightness of the first video signal of the partial area,
  to compress a dynamic range of the first video signal depending on the calculated representative value, and
  to generate a second video signal, a dynamic range of the second video signal being restricted to a second dynamic range narrower than the first dynamic range.

(2) The video signal processing apparatus according to (1) above, in which
  the arithmetic processing circuit is configured to compress the dynamic range of the first video signal by multiplying the first video signal by a gain value depending on the calculated representative value.

(3) The video signal processing apparatus according to (2) above, in which
the arithmetic processing circuit is configured to multiply the first video signal by a negative gain value, an absolute value of the negative gain value being larger as the calculated representative value is larger.

(4) The video signal processing apparatus according to any one of (1) to (3) above, in which
the arithmetic processing circuit is configured to calculate the representative value of brightness by making weight of a value of brightness different between a center portion and another portion of the partial area in the first video signal.

(5) The video signal processing apparatus according to any one of (1) to (4) above, in which
the arithmetic processing circuit is configured to perform gamma processing of compressing a high brightness portion on the second video signal, the gamma processing increasing a display range of the high brightness portion of the second video signal.

(6) The video signal processing apparatus according to any one of (1) to (5) above, further including
a third interface configured to output the second video signal generated by the arithmetic processing circuit to an apparatus including a display, the display being capable of displaying video within the second dynamic range.

(7) A video signal processing method, including, by an arithmetic processing circuit:
obtaining, by using a first interface, a first video signal imaged within a first dynamic range;
obtaining, by using a second interface, information for specifying a partial area of the obtained first video signal; and
calculate a representative value of brightness of the first video signal of the partial area, comparing a dynamic range of the first video signal depending on the calculated representative value, and generating a second video signal, a dynamic range of the second video signal being restricted to a second dynamic range narrower than the first dynamic range.

(8) The video signal processing method according to (7) above, in which
the arithmetic processing circuit compresses the dynamic range of the first video signal by multiplying the first video signal by a gain value depending on the calculated representative value.

(9) The video signal processing method according to (8) above, in which
the arithmetic processing circuit multiplies the first video signal by a negative gain value, an absolute value of the negative gain value being larger as the calculated representative value is larger.

(10) The video signal processing method according to any one of (7) to (9) above, in which
the arithmetic processing circuit calculates the representative value of brightness by making weight of a value of brightness different between a center portion and another portion of the partial area in the first video signal.

(11) The video signal processing method according to any one of (7) to (10) above, in which
the arithmetic processing circuit performs gamma processing of compressing a high brightness portion on the second video signal, the gamma processing increasing a display range of the high brightness portion of the second video signal.

(12) The video signal processing method according to any one of (7) to (11) above, further including
outputting, by a third interface, the second video signal generated by the arithmetic processing circuit to an apparatus including a display, the display being capable of displaying video within the second dynamic range.

(13) A program that causes a computer to operate as:
a video signal processing apparatus including
a first interface configured to obtain a first video signal imaged within a first dynamic range,
a second interface configured to obtain information for specifying a partial area of the obtained first video signal, and
an arithmetic processing circuit configured
to calculate a representative value of brightness of the first video signal of the partial area,
to compress a dynamic range of the first video signal depending on the calculated representative value, and
to generate a second video signal, a dynamic range of the second video signal being restricted to a second dynamic range narrower than the first dynamic range.

(14) The program according to (13) above, in which
the arithmetic processing circuit compresses the dynamic range of the first video signal by multiplying the first video signal by a gain value depending on the calculated representative value.

(15) The program according to (14) above, in which
the arithmetic processing circuit multiplies the first video signal by a negative gain value, an absolute value of the negative gain value being larger as the calculated representative value is larger.

(16) The program according to any one of (13) to (15) above, in which
the arithmetic processing circuit calculates the representative value of brightness by making weight of a value of brightness different between a center portion and another portion of the partial area in the first video signal.

(17) The program according to any one of (13) to (16) above, in which
the arithmetic processing circuit performs gamma processing of compressing a high brightness portion on the second video signal, the gamma processing increasing a display range of the high brightness portion of the second video signal.

(18) The program according to any one of (13) to (17) above, in which
a third interface outputs the second video signal generated by the arithmetic processing circuit to an apparatus including a display, the display being capable of displaying video within the second dynamic range.

(19) An electronic device including:
circuitry configured to
obtain a first video signal having a first dynamic range;
calculate a representative value of brightness of a partial area of the first video signal;
modify the first dynamic range of the first video signal based on the calculated representative value; and
generate a second video signal based on the modifying, the second video signal having a second dynamic range that is different than the first dynamic range.

(20) The electronic device of (19), wherein
the circuitry is configured to modify the dynamic range of the first video signal by compressing the dynamic range of the first video signal based on the calculated representative value.

(21) The electronic device of any of (19) to (20), wherein
the second dynamic range of the second video signal is narrower than the first dynamic range of the first video signal.

(22) The electronic device of any of (19) to (21), wherein
the circuitry is configured to obtain information for specifying the partial area of the first video signal.

(23) The electronic device of (20), wherein
the circuitry is configured to compress the dynamic range of the first video signal by multiplying the first video signal by a gain value corresponding to the calculated representative value.

(24) The electronic device of (23), wherein
the circuitry is configured to multiply the first video signal by a negative gain value.

(25) The electronic device of (24), wherein
an absolute value of the negative gain value is a first value when the calculated representative value is a second value, and
the absolute value of the negative gain is a third value, which is greater than the first value, when the calculated representative value is a fourth value, which is greater than the second value.

(26) The electronic device of any of (19) to (25), wherein
the circuitry is configured to calculate the representative value of brightness by allocating a first weight to a value of brightness at a center portion of the partial area and a second weight, which is different from the first weight, to a value of brightness at another portion of the partial area.

(27) The electronic device of any of (19) to (26), wherein
the circuitry is configured to perform gamma processing to compress a portion of the second video signal to increase a display range of the portion of the second video signal.

(28) The electronic device of any of (19) to (27), wherein
the circuitry is configured to output the second video to an apparatus including a display.

(29) The electronic device of any of (19) to (28), wherein
the circuitry includes:
a first communication interface configured to obtain the first video signal; and
a second communication interface configured to obtain the information for specifying the partial area.

(30) The electronic device of (29), wherein
the circuitry includes a third communication interface configured to output the second video to an apparatus including a display.

(31) A video signal processing method performed by an electronic device, the method including:
obtaining a first video signal having a first dynamic range;
calculating a representative value of brightness of a partial area of the first video signal;
modifying the first dynamic range of the first video signal based on the calculated representative value; and
generating a second video signal based on the modifying, the second video signal having a second dynamic range that is different than the first dynamic range.

(32) A non-transitory computer-readable medium including computer program instructions, which when executed by an electronic device, cause the electronic device to:
obtain a first video signal having a first dynamic range;
calculate a representative value of brightness of a partial area of the first video signal;
modify the first dynamic range of the first video signal based on the calculated representative value; and
generate a second video signal based on the modifying, the second video signal having a second dynamic range that is different than the first dynamic range.

(33) An electronic device including:
circuitry configured to
obtain a video signal having a first dynamic range;
calculate a first value indicating a brightness of a first portion of the video signal, wherein the first portion of the video signal is less than the entirety of the video signal; and
modify the first dynamic range of the first portion of the video signal based on the calculated value.

(34) The electronic device of claim 33), wherein the circuitry is configured to:
calculate a second value indicating a brightness of a second portion of the video signal that is less than the entirety of the video signal; and
modify the first dynamic range of the second portion of the video signal based on the calculated value.

(35) The electronic device of any of (33) to (34), wherein
the circuitry is configured to modify the first dynamic range of the first portion of the video signal by reducing the first dynamic range to a second dynamic range that is narrower than the first dynamic range.

(36) The electronic device of any of (33) to (35), wherein
the circuitry is configured to compress the first dynamic range of the first portion of the video signal based on the calculated first value.

(37) The electronic device of (36), wherein
the circuitry is configured to compress the first dynamic range of the first portion of the video signal by multiplying the first video signal by a gain value corresponding to the calculated first value.

(38) The electronic device of any of (33) to (37), wherein
the circuitry is configured to reduce the first dynamic range of the first portion of the video signal by multiplying the first video signal by a negative gain value corresponding to the calculated first value.

(39) The electronic device of (20), wherein
an absolute value of the negative gain value is a second value when the calculated first value is a third value, and
the absolute value of the negative gain is a fourth value, which is greater than the second value, when the calculated first value is a fifth value, which is greater than the third value.

(40) The electronic device of any of (33) to (39), wherein
the circuitry is configured to calculate the first value by allocating a first weight to a value of brightness at a center area of the first portion and a second weight, which is different from the first weight, to a value of brightness at another area of the first portion.

(41) The electronic device of any of (33) to (40), wherein
the circuitry is configured to perform gamma processing to the first portion of the video signal to increase a display range of the first portion of the video signal.

(42) The electronic device of any of (33) to (41), wherein
the circuitry is configured to output the first portion of the video signal to an apparatus including a display.

(43) The electronic device of any of (33) to (42), wherein
the circuitry is configured to:
calculate a brightness histogram of the first portion of the video signal;

determine whether a difference in average brightness between a plurality of areas of the first portion of the video signal exceeds a threshold value; and modify the first dynamic range of the first portion of the video signal based on the determining.

(44) A video processing method performed by an electronic device, the video processing method including:

obtaining a video signal having a first dynamic range;

calculating, by circuitry of the electronic device, a first value indicating a brightness of a first portion of the video signal that is less than an entirety of the video signal; and modifying, by the circuitry, the first dynamic range of the first portion of the video signal based on the calculated value.

(45) A non-transitory computer-readable medium including computer program instructions, which when executed by an electronic device, cause the electronic device to:

obtain a video signal having a first dynamic range;

calculate a first value indicating a brightness of a first portion of the video signal that is less than an entirety of the video signal; and modify the first dynamic range of the first portion of the video signal based on the calculated value.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 1 video signal processing system
10 imaging unit
11 camera
20 VR signal processing unit
30 encoding/delivery unit
40 information processing apparatus
41 CPU
42 memory
42 communication interface
43 communication interface
44 communication interface
45 communication interface
50 head mounted display (HMD)
60 HMD controller
70 network

The invention claimed is:

1. An electronic device, comprising:
circuitry configured to
obtain a video signal having a first dynamic range;
calculate a first value indicating a brightness of a first portion of the video signal, wherein the first portion of the video signal is less than an entirety of the video signal; and
modify the first dynamic range of the first portion of the video signal based on the calculated value,
wherein the circuitry is configured to calculate the first value by allocating a first weight to a value of brightness at a center area of the first portion and a second weight, which is different from the first weight, to a value of brightness at another area of the first portion.

2. The electronic device of claim 1, wherein the circuitry is further configured to:
calculate a second value indicating a brightness of a second portion of the video signal that is less than an entirety of the video signal; and
modify the first dynamic range of the second portion of the video signal based on the calculated second value.

3. The electronic device of claim 1, wherein
the circuitry is further configured to modify the first dynamic range of the first portion of the video signal by reducing the first dynamic range to a second dynamic range that is narrower than the first dynamic range.

4. The electronic device of claim 1, wherein
the circuitry is further configured to compress the first dynamic range of the first portion of the video signal based on the calculated first value.

5. The electronic device of claim 4, wherein
the circuitry is further configured to compress the first dynamic range of the first portion of the video signal by multiplying the first video signal by a gain value corresponding to the calculated first value.

6. The electronic device of claim 1, wherein
the circuitry is further configured to reduce the first dynamic range of the first portion of the video signal by multiplying the first video signal by a negative gain value corresponding to the calculated first value.

7. The electronic device of claim 6, wherein
an absolute value of the negative gain value used liv the circuitry to multiple the first video signal is a second value when the calculated first value is a third value, and
the absolute value of the negative gain is a fourth value, which is greater than the second value, when the calculated first value is a fifth value, which is greater than the third value.

8. The electronic device of claim 1, wherein
the circuitry is further configured to perform gamma processing to the first portion of the video signal to increase a display range of the first portion of the video signal.

9. The electronic device of claim 1, wherein
the circuitry is further configured to output the first portion of the video signal to an apparatus including a display.

10. An electronic device, comprising:
circuitry configured to
obtain a video signal having a first dynamic range;
calculate a first value indicating a brightness of a first portion of the video signal, wherein the first portion of the video signal is less than an entirety of the video signal; and
modify the first dynamic range of the first portion of the video signal based on the calculated value,
wherein the circuitry is further configured to:
calculate a brightness histogram of the first portion of the video signal;
determine whether a difference in average brightness between a plurality of areas of the first portion of the video signal exceeds a threshold value; and
modify the first dynamic range of the first portion of the video signal based on a result of the determining.

11. An electronic device, comprising:
circuitry configured to
obtain a video signal having a first dynamic range;
calculate a first value indicating a brightness of a first portion of the video signal, wherein the first portion of the video signal is less than an entirety of the video signal; and
modify the first dynamic range of the first portion of the video signal based on the calculated value, wherein the circuitry is further configured to determine the first portion of the video signal based on a line-of-sight direction determined from an image of the user; and the circuitry is further configured to calculate the first value by allocating a first weight to a value of brightness at a first area of the first portion and a second weight, which is different from the first weight, to a value of brightness at a second area of the first portion different from the first area.

12. The electronic device of claim 10, wherein the circuitry is further configured to:

calculate a second value indicating a brightness of a second portion of the video signal that is less than an entirety of the video signal; and modify the first dynamic range of the second portion of the video signal based on the calculated second value.

13. The electronic device of claim 10, wherein the circuitry is further configured to modify the first dynamic range of the first portion of the video signal by reducing the first dynamic, rare to a second dynamic range that is narrower than the first dynamic range.

14. The electronic device of claim 10, wherein the circuitry is further configured to compress the first dynamic range of the first portion of the video signal based on the calculated first value.

15. The electronic device of claim wherein the circuitry is further configured to reduce the first dynamic range of the first portion of the video signal by multiplying the first video signal by a negative gain value corresponding to the calculated first value.

16. The electronic device of claim 10, wherein the circuitry is configured to calculate the first value by allocating a first weight to a value of brightness at a center area of the first portion and a second weight, which is different from the first weight, to a value of brightness at another area of the first portion.

17. The electronic device of claim 10, wherein the circuitry is further configured to perform gamma processing to the first portion of the video signal to increase a display range of the first portion of the video signal.

18. The electronic device of claim 10, wherein the circuitry is further configured to output the first portion of the video signal to an apparatus including a display.

19. The electronic device of claim 11, wherein the circuitry is further configured to determine the line-of-sight direction based on the image of the user, which includes eyes of the user.

20. The electronic device of claim 19, wherein the circuitry is further configured to determine the line-of-sight direction based on the image of the eyes, which is captured by a camera.

* * * * *